United States Patent [19]
Miller et al.

[11] Patent Number: 5,890,196
[45] Date of Patent: Mar. 30, 1999

[54] METHOD AND APPARATUS FOR PERFORMING PAGE MODE ACCESSES

[75] Inventors: Michael R. Miller; Nancy G. Woodbridge; Thomas A. Volpe; James G. Gay, all of Austin, Tex.

[73] Assignee: Motorola, Inc., Schuamburg, Ill.

[21] Appl. No.: 623,499

[22] Filed: Mar. 28, 1996

[51] Int. Cl.[6] .................................................. A06F 12/00
[52] U.S. Cl. ........................................ 711/105; 364/DIG. 1
[58] Field of Search ................................... 395/800, 433, 395/432; 365/205, 210; 711/105

[56] References Cited

U.S. PATENT DOCUMENTS

| | | | |
|---|---|---|---|
| 4,989,182 | 1/1991 | Mochizuki et al. | 365/210 |
| 5,077,693 | 12/1991 | Hardee et al. | 365/230.08 |
| 5,083,172 | 1/1992 | Kiyono | 357/23.6 |
| 5,193,193 | 3/1993 | Iyer | 395/297 |
| 5,241,503 | 8/1993 | Cheng | 365/205 |
| 5,418,924 | 5/1995 | Dresser | 395/494 |
| 5,440,711 | 8/1995 | Susimoto | 395/433 |
| 5,530,965 | 6/1996 | Kawasaki et al. | 395/800 |

OTHER PUBLICATIONS

Levy, Markus; "The Dynamics of DRAM Technology;" EDN; Jan. 5, 1995; pp. 46–56.

*Primary Examiner*—Tod R. Swann
*Assistant Examiner*—David Laugjahr

[57] ABSTRACT

An external bus master (205) accesses a DRAM (207) using a memory controller (804) internal to a data processor (3) without the use of external multiplexers or any other external circuitry. The need for external multiplexers and even a dedicated integrated circuit pin for providing external control during external master initiated DRAM accesses is removed by the implementation of a circuit and technique for multiplexing row and column addresses of the DRAM internally within the data processor.

9 Claims, 17 Drawing Sheets

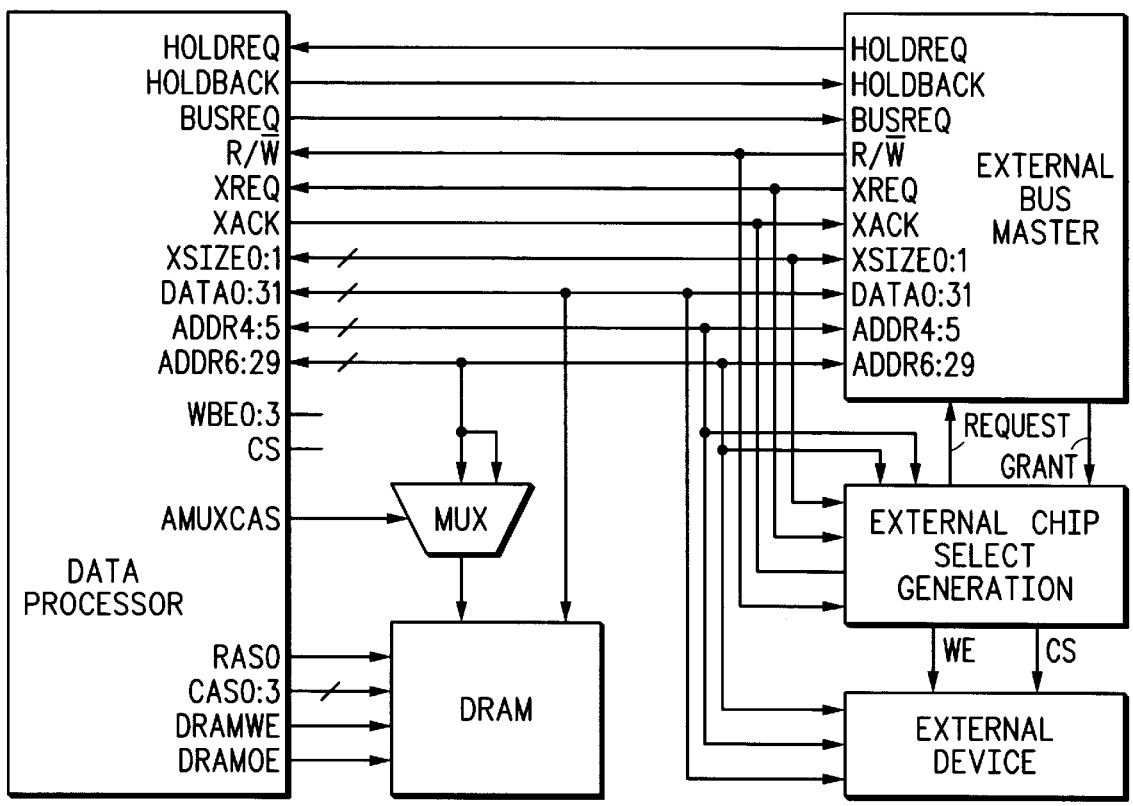
FIG.1
−PRIOR ART−
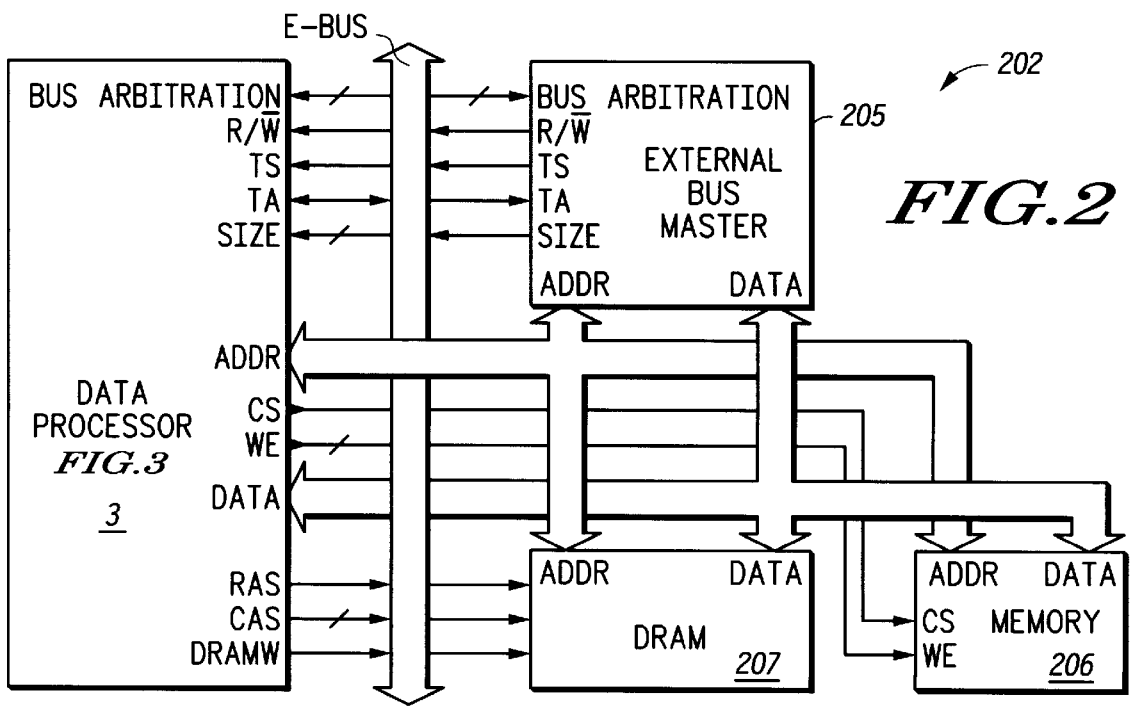
FIG.2
FIG.3

CHIP SELECT ADDRESS
REGISTER (CSAR 0-7)

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| BA31 | BA30 | BA29 | BA28 | BA27 | BA26 | BA25 | BA24 | BA23 | BA22 | BA21 | BA20 | BA19 | BA18 | BA17 | BA16 |

*FIG.12-1*

CHIP SELECT MASK
REGISTER (CSMR 0-7)

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| BAM31 | BAM30 | BAM29 | BAM28 | BAM27 | BAM26 | BAM25 | BAM24 | BAM23 | BAM22 | BAM21 | BAM20 | BAM19 | BAM18 | BAM17 | BAM16 |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| – | – | – | – | – | – | – | – | – | CPU | SC | SD | UC | UD | – | – |

*FIG.12-2*

CHIP SELECT CONTROL
REGISTER (CSCR 0-7)

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| WS3 | WS2 | WS1 | WS0 | – | – | EMAA | AA | PS1 | PS0 | BRST | ASET | WRAH | RDAH | WR | RD |

*FIG.12-3*

DRAM CONTROLLER
REFRESH REGISTER (DCRR)

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| – | – | – | – | RC11 | RC10 | RC9 | RC8 | RC7 | RC6 | RC5 | RC4 | RC3 | RC2 | RC1 | RC0 |

*FIG.13-1*

DRAM CONTROLLER
TIMING REGISTER (DCTR)

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| DAEM | EDO | – | RCD | – | RSH1 | RSH0 | – | – | CRP1 | CRP0 | – | CAS | – | CP | CSR |

*FIG.13-2*

DRAM CONTROLLER ADDRESS
REGISTER (DCAR 0-1)

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| BA31 | BA30 | BA29 | BA28 | BA27 | BA26 | BA25 | BA24 | BA23 | BA22 | BA21 | BA20 | BA19 | BA18 | BA17 | – |

*FIG.13-3*

DRAM CONTROLLER MASK
REGISTER (DCMR 0-1)

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| BAM31 | BAM30 | BAM29 | BAM28 | BAM27 | BAM26 | BAM25 | BAM24 | BAM23 | BAM22 | BAM21 | BAM20 | BAM19 | BAM18 | BAM17 | – |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| – | – | – | – | – | – | – | – | – | – | SC | SD | UC | UD | – | – |

*FIG.13-4*

DRAM CONTROLLER CONTROL
REGISTER (DCCR 0-1)

| 7 | 6 | 5 | 4 | 3 | 2 | 1 | 0 |
|---|---|---|---|---|---|---|---|
| PS1 | PS0 | BPS1 | BPS0 | PM1 | PM0 | WR | RD |

8-BIT PORT SIZE ADDRESS
MULTIPLEXING CONFIGURATIONS

| ADDRESS PIN | 512 BYTE PAGE | | 1K BYTE PAGE | | 2K BYTE PAGE | |
|---|---|---|---|---|---|---|
| | RAS | CAS | RAS | CAS | RAS | CAS |
| 27 | 27 | 26 | 27 | 26 | 27 | 26 |
| 26 | 26 | 26 | 26 | 26 | 26 | 26 |
| 25 | 25 | 24 | 25 | 24 | 25 | 24 |
| 24 | 24 | 24 | 24 | 24 | 24 | 24 |
| 23 | 23 | 22 | 23 | 22 | 23 | 22 |
| 22 | 22 | 22 | 22 | 22 | 22 | 22 |
| 21 | 21 | 20 | 21 | 20 | 21 | 10 |
| 20 | 20 | 20 | 20 | 20 | 20 | 9 |
| 19 | 19 | 18 | 19 | 9 | 19 | 8 |
| 18 | 18 | 18 | 18 | 8 | 18 | 7 |
| 17 | 17 | 8 | 17 | 7 | 17 | 6 |
| 16 | 16 | 7 | 16 | 6 | 16 | 5 |
| 15 | 15 | 6 | 15 | 5 | 15 | 4 |
| 14 | 14 | 5 | 14 | 4 | 14 | 3 |
| 13 | 13 | 4 | 13 | 3 | 13 | 2 |
| 12 | 12 | 3 | 12 | 2 | 12 | 1 |
| 11 | 11 | 2 | 11 | 1 | 11 | 0 |
| 10 | 10 | 1 | 10 | 0 | 10 | 10 |
| 9 | 9 | 0 | 9 | 9 | 9 | 9 |

16-BIT PORT SIZE ADDRESS
MULTIPLEXING CONFIGURATIONS

| ADDRESS PIN | 512 BYTE PAGE | | 1K BYTE PAGE | | 2K BYTE PAGE | |
|---|---|---|---|---|---|---|
| | RAS | CAS | RAS | CAS | RAS | CAS |
| 27 | 27 | 27 | 27 | 27 | 27 | 27 |
| 26 | 26 | 25 | 26 | 25 | 26 | 25 |
| 25 | 25 | 25 | 25 | 25 | 25 | 25 |
| 24 | 24 | 23 | 24 | 23 | 24 | 23 |
| 23 | 23 | 23 | 23 | 23 | 23 | 23 |
| 22 | 22 | 21 | 22 | 21 | 22 | 21 |
| 21 | 21 | 21 | 21 | 21 | 21 | 21 |
| 20 | 20 | 19 | 20 | 19 | 20 | 10 |
| 19 | 19 | 19 | 19 | 19 | 19 | 9 |
| 18 | 18 | 17 | 18 | 9 | 18 | 8 |
| 17 | 17 | 17 | 17 | 8 | 17 | 7 |
| 16 | 16 | 8 | 16 | 7 | 16 | 6 |
| 15 | 15 | 7 | 15 | 6 | 15 | 5 |
| 14 | 14 | 6 | 14 | 5 | 14 | 4 |
| 13 | 13 | 5 | 13 | 4 | 13 | 3 |
| 12 | 12 | 4 | 12 | 3 | 12 | 2 |
| 11 | 11 | 3 | 11 | 2 | 11 | 1 |
| 10 | 10 | 2 | 10 | 1 | 10 | 10 |
| 9 | 9 | 1 | 9 | 9 | 9 | 9 |

*FIG.14-2*

32-BIT PORT SIZE ADDRESS
MULTIPLEXING CONFIGURATIONS

| ADDRESS PIN | 512 BYTE PAGE | | 1K BYTE PAGE | | 2K BYTE PAGE | |
|---|---|---|---|---|---|---|
| | RAS | CAS | RAS | CAS | RAS | CAS |
| 27 | 27 | 26 | 27 | 26 | 27 | 26 |
| 26 | 26 | 26 | 26 | 26 | 26 | 26 |
| 25 | 25 | 24 | 25 | 24 | 25 | 24 |
| 24 | 24 | 24 | 24 | 24 | 24 | 24 |
| 23 | 23 | 22 | 23 | 22 | 23 | 22 |
| 22 | 22 | 22 | 22 | 22 | 22 | 22 |
| 21 | 21 | 20 | 21 | 20 | 21 | 20 |
| 20 | 20 | 20 | 20 | 20 | 20 | 20 |
| 19 | 19 | 18 | 19 | 18 | 19 | 10 |
| 18 | 18 | 18 | 18 | 18 | 18 | 9 |
| 17 | 17 | 16 | 17 | 9 | 17 | 8 |
| 16 | 16 | 16 | 16 | 8 | 16 | 7 |
| 15 | 15 | 8 | 15 | 7 | 15 | 6 |
| 14 | 14 | 7 | 14 | 6 | 14 | 5 |
| 13 | 13 | 6 | 13 | 5 | 13 | 4 |
| 12 | 12 | 5 | 12 | 4 | 12 | 3 |
| 11 | 11 | 4 | 11 | 3 | 11 | 2 |
| 10 | 10 | 3 | 10 | 2 | 10 | 10 |
| 9 | 9 | 2 | 9 | 9 | 9 | 9 |

*FIG. 14-3*

METHOD AND APPARATUS FOR PERFORMING PAGE MODE ACCESSES

CROSS REFERENCE TO A RELATED APPLICATION

This application is related to our commonly assigned copending patent applications entitled:

"A Method and Apparatus for Accessing a Chip-Selectable Device in a Data Processing System", by Nancy G. Woodbridge et al., Attorney Docket Number SC-90018A, application No. 08/623,482, and filed concurrently herewith.

FIELD OF THE INVENTION

The present invention relates, in general, to a data processor which communicates information between an external master and an external memory and, more particularly, to a data processor which communicates information between an external dynamic random access memory (DRAM), an external chip selectable device, and an external master.

BACKGROUND OF THE INVENTION

Dynamic Random Access Memory (DRAM) circuits are typically used in semiconductor data processing systems to provide inexpensive memory for use during a myriad of data processing operations. Current data processing systems which have implemented multiple data processors that access common DRAM circuits typically require an external multiplexer for providing proper address multiplexing. Such address multiplexing is required to provide a proper address to the DRAM circuit during a memory access operation. Because the pin count of a DRAM circuit is typically limited, a multiplexer is required to provide either a row address or a column address to a same preselected portion of integrated circuit pins of the DRAM circuit when the appropriate control is provided by one of the multiple data processors. The data processor provides a RAS (Row Address Strobe) or a CAS (Column Address Strobe) signal to the DRAM circuit to indicate whether a row address or a column address is currently being provided on the preselected portion of integrated circuit pins of the DRAM circuit. Additionally, a DRAMW signal is provided to indicate a read or a write access to the DRAM circuit. Note, in a typical DRAM circuit, the RAS signal indicates the preselected portion of integrated circuit pins of the DRAM circuit are receiving a row address value and the CAS bus indicates the preselected portion of integrated circuit pins of the DRAM circuit are receiving a column address. In addition to the RAS, CAS, and DRAMW signals, the data processor must also generally designate at least one integrated pin to provide control for the multiplexer. In an art area in which the number of integrated circuit pins is limited, the use of a single pin for providing multiplexer control may be onerous to designers of the data processing system.

Furthermore, the external logic required to implement the multiplexer in prior art implementations often adds a substantial amount of overhead cost to the data processing system which include an external master. In data processing systems using the AM29200 manufactured by Advanced Micro Devices, and the PPC403GA manufactured by International Business Machines, external multiplexing such as that described above is required. Each of these systems requires a configuration such as that illustrated in FIG. 1. Therefore, although current implementations of DRAM controllers function adequately, a need exists for a data processing system which does not require the use of the aforementioned multiplexer or an additional external integrated circuit pin to control that multiplexer.

Another area which causes concern for data processing system designers results when an internal and external master device both use chip select and write enable generation logic in a data processor. When an external master initiates a bus transfer using internal chip select generation, often times, the external master requires a different amount of time to access the chip selected memory than an internal master. This is because the external master address and bus attributes are not available to the internal controller in the same amount of time as the internal master address and bus attributes. If this is the case and the external master wants to use the internal chip select generation logic, the prior art solutions may either require the internal master access to be changed to match the external master access or may allow the internal master access to be one clock cycle shorter than the external master access.

If a user can not use either of the above solutions, the user will be unable to use the internal chip select and write enable generation logic. In this situation, the user must add such logic to the external system for external master accesses. Therefore, a need also exists for a data processor which will allow a user to take advantage of internally implemented chip select and write enable generation logic when an external master has accessed an external memory, without requiring the timing of the external master access to be the same or one cycle slower than that of an internal master access.

BRIEF DESCRIPTION OF THE DRAWINGS

FIG. 1 illustrates in block diagram form a prior art implementation of a data processing system which implements an external memory controller;

FIG. 2 illustrates in block diagram form an implementation of a data processing system which implements an external memory controller in accordance with one implementation of the present invention;

FIG. 12-1 illustrates in tabular form a chip select address register included in the plurality of chip select registers of the system bus controller of FIG. 4;

FIG. 12-2 illustrates in tabular form a chip select mask register included in the plurality of chip select registers of the system bus controller of FIG. 4;

FIG. 12-3 illustrates in tabular form a chip select control register included in the plurality of chip select registers of the system bus controller of FIG. 4;

FIG. 13-1 illustrates in tabular form a DRAM controller refresh register included in the plurality of DRAM control registers of the system bus controller of FIG. 4;

FIG. 13-2 illustrates in tabular form a DRAM controller timing register included in the plurality of DRAM control registers of the system bus controller of FIG. 4;

FIG. 13-3 illustrates in tabular form a DRAM controller address register included in the plurality of DRAM control registers of the system bus controller of FIG. 4;

FIG. 13-4 illustrates in tabular form a DRAM controller mask register included in the plurality of DRAM control registers of the system bus controller of FIG. 4;

FIG. 13-5 illustrates in tabular form a DRAM controller control register included in the plurality of DRAM control registers of the system bus controller of FIG. 4;

FIG. 14-1 illustrates in tabular form eight bit data port size address multiplexing configurations implemented in one embodiment of the present invention;

FIG. 14-2 illustrates in tabular form sixteen bit data port size address multiplexing configurations implemented in one embodiment of the present invention;

FIG. 14-3 illustrates in tabular form thirty-two bit data port size address multiplexing configurations implemented in one embodiment of the present invention;

DETAILED DESCRIPTION OF THE INVENTION

The present invention provides an apparatus and method for communicating information between a data processor, an external memory or device, and an external master. The apparatus and method of the present invention allows the data processor to properly control the external memory or device during an access by the external master such that less external interface circuitry is required and the overhead costs associated with the data processing system are reduced.

Figures 1, 5, 13, 14:
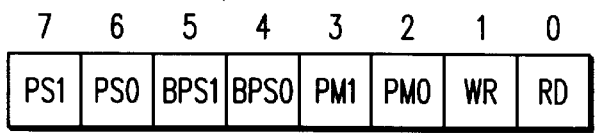

In the present invention, a circuit and method of operation are provided for controlling an external memory in a data processing system such that no external circuitry is required for performing a multiplexing function during a DRAM circuit access. Furthermore, the present invention removes a need for external multiplexers and a dedicated integrated circuit pin on a data processor for dynamic random access memory (DRAM) accesses by an external master device. The present invention implements the multiplexing function required to access DRAM circuits without requiring a dedicated integrated circuit pin such as that required by the prior art data processing systems as illustrated in FIG. 1. The increased flexibility and decreased integrated circuit pin requirements of the data processor of the present invention result in a data processing system which has lower system costs and may be easily updated to take advantage of the latest advances in the semiconductor market.

In a second aspect of the present invention, a user may program the data processor of the present invention such that external master chip select accesses can be either the same number of cycles as the internal master accesses, or can use external transfer acknowledge termination and be any number of cycles. The user can program the use of external transfer acknowledge termination for internal and external master chip select accesses, independently and on a chip select basis while still using the internal chip select and write enable generation logic. The flexibility provided by this aspect of the present invention allows the user to compensate for the different external master cycle timings without requiring external chip select and write enable generation logic. Therefore, overhead is conserved and efficiency is increased in this embodiment of the present invention.

In a following discussion, the connectivity and operation of one embodiment of a data processing system which implements the present invention will be provided in greater detail.

Connectivity of the Present Invention

In the following description of the connectivity of the present invention, the term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

Furthermore, the symbol "$" preceding a number indicates that the number is represented in its hexadecimal or base sixteen form. The symbol "%" preceding a number indicates that the number is represented in its binary or base two form.

In the following description of the present invention, it should be noted that the terms field and bit may be used interchangeably.

FIG. 2 illustrates a data processing system 202 in accordance with one embodiment of the present invention. Data processing system 202 includes a data processor 3, an external bus master 205, a memory 206, and a DRAM 207. Data processor 3 is coupled to external bus master 205, memory 206, and DRAM 207 via an E-bus (External Bus). The E-bus couples a Bus Arbitration bus, a Read/Write (R/W) signal, a Transfer Start (TS) signal, a Transfer Acknowledge (TA) signal, and a Size bus between data processor 3 and external bus master 205. An Address bus and a Data bus is also coupled between data processor 3 and each of external bus master 205, memory 206, and DRAM 207 by the E-bus. Additionally, data processor 3 is coupled to DRAM 207 via the E-bus to provide a Row Address Strobe (RAS) signal, a Column Address Strobe (CAS) bus, and a DRAM Write (DRAMW) signal. Data processor 3 is coupled to memory 206 via the E-bus to provide a Chip Select (CS) signal and a Write Enable (WE) bus. The Bus Arbitration bus is a compilation of a Bus Request (BR), a Bus Grant (BG) and a Bus Driven (BD) signal in the present embodiment of the invention. However, bus arbitration and the signals involved therein are well known in the data processing art and other implementations including other signals may be implemented herein.

Figure 3:
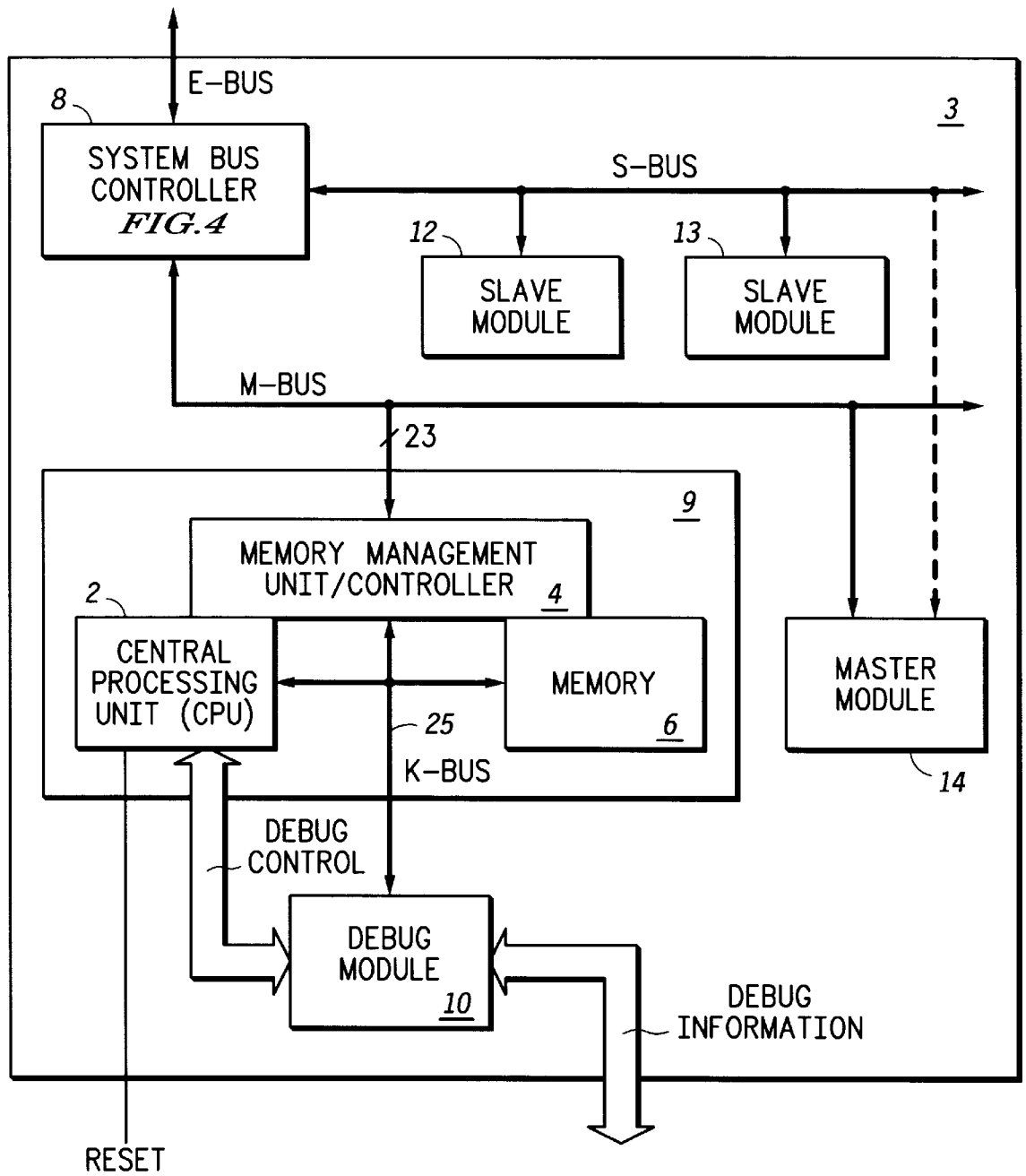
FIG. 3 illustrates in block diagram form a data processor in accordance with one implementation of the present invention.

Referring now to FIG. 3, FIG. 3 illustrates a data processor 3 in accordance with one embodiment of the present invention. Data processor 3 includes a system bus controller 8, a core 9, a slave module 12, a slave module 13, a master module 14, and a debug module 10. System bus controller 8 is coupled to an external device (not illustrated herein) via an E-Bus. System bus controller 8 is coupled to slave module 12 and slave module 13 via an S-Bus. The S-Bus is a slave module bus. System bus controller 8 is coupled to core 9 and master module 14 via an M-Bus 23. M-Bus 23 is a master module bus. It should be understood that FIG. 3 illustrates one embodiment of the present invention. Therefore, multiple slave modules and multiple master modules may be implemented in an alternate embodiment of data processor 3.

Core 9 comprises a central processing unit (CPU) 2, a memory management unit (MMU)/controller 4, and a memory 6. Central processing unit 2, MMU/controller 4, memory 6, and debug module 10 are each coupled to one another via a K-bus 25. Both central processing unit 2 and memory 6 are also directly connected to MMU/controller 4. MMU/controller 4 provides information to a remaining portion of data processor 3 via a M-Bus 23. CPU 2 receives a Reset signal from an external device. Debug module 10 communicates a plurality of Debug Information with a device external to data processor 3 (not illustrated herein).

Figure 4:
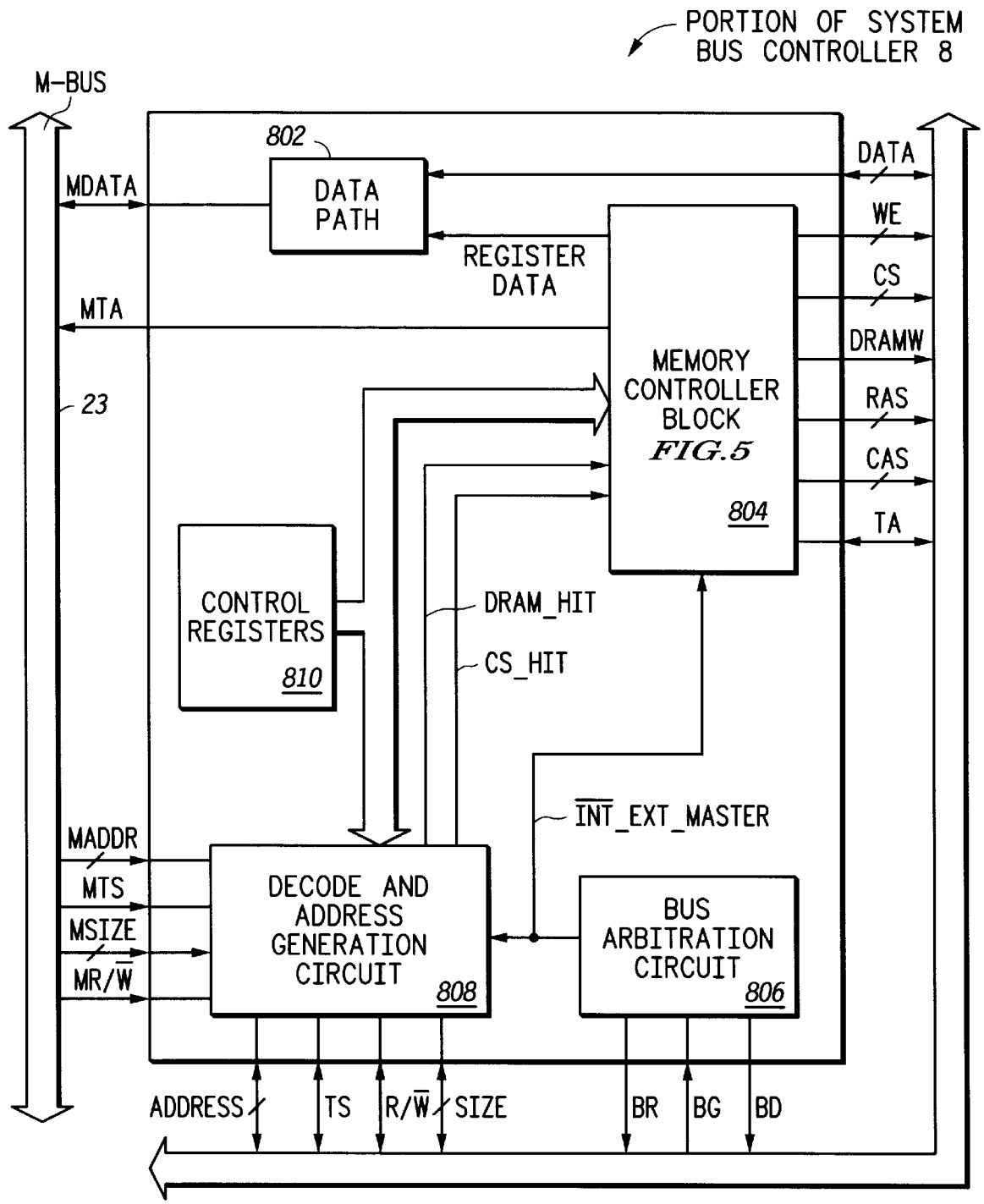
FIG. 4 illustrates in block diagram form a system bus controller of the data processor of FIG. 3.

FIG. 4 illustrates a portion of system bus controller 8. System bus controller 8 comprises a data path circuit 802, a memory controller 804, a bus arbitration circuit 806, a decode and address generation circuit 808, and a control registers 810.

The E-bus bidirectionally couples an external Data bus to data path control circuit 802. M-bus 23 also bidirectionally couples a Master Data (MData) bus to data path circuit 802. Data path circuit 802 is also coupled to memory controller 804 to receive a Register Data signal.

Memory controller 804 is coupled to M-bus 23 to provide a Master Transfer Acknowledge (MTA) signal. Memory controller 804 is coupled to the E-bus to provide a Write Enable (WE) bus, a Chip Select (CS) signal, a DRAM Write (DRAMW) signal, a Row Address Strobe (RAS) signal, a Column Address Strobe (CAS) bus, and a Transfer Acknowledge (TA) signal.

Memory controller 804 is also coupled to control registers 810 to receive a plurality of control information. Memory controller 804 is coupled to decode and address generation circuit 808 to receive a DRAM__hit signal and a CS__hit signal. Memory controller 804 is coupled to bus arbitration circuit 806 to receive a int__ext__master (not internal, but external master) signal.

Bus arbitration circuit 806 is coupled to the E-bus to receive a Bus Grant (BG) signal and to provide a Bus Request (BR) signal and a Bus Driven (BD) signal. Bus arbitration circuit is coupled to decode and address generation circuit 808 to provide the int__ext__master signal.

Decode and address generation circuit 808 is bidirectionally coupled to the E-bus to communicate an address value, a Transfer Start (TS) signal, a Read/Write(R/W) signal, and a Size bus. Decode and address generation circuit 808 is also coupled to control registers 810 to receive the plurality of control information. Decode and address generation circuit 808 is also coupled to M-bus 23 to receive a Master Address (MADDR) value, a Master Transfer Start (MTS) signal, a Master Size (MSIZE) bus, and a Master Read/Write(MR/W) signal.

Register Descriptions

The portion of system bus controller 8 which implements one embodiment of the present invention includes the plurality of control registers 810. Each of the registers used in implementing the present invention will subsequently be described in greater detail. Furthermore, the use of control registers 810 during operation of the present invention will described later in greater detail.

The plurality of control registers 810 are illustrated in greater detail in FIGS. 12-1 through 12-3 and FIGS. 13-1 through 13-5. The plurality of control registers 810 include a chip select address register (CSAR0-7), a chip select mask register (CSMR0–CSMR7), and a chip select control register (CSCR0–CSCR7).

A representative one of the plurality of chip select address registers (CSAR) is illustrated in FIG. 12-1. Each chip select address register determines a base address of a chip select pin. Each of the bits BA31 through BA16 defines a base address location of memory dedicated to each chip select. These bits are compared to the upper bits of an internal address bus to determine if a chip select memory is being accessed.

A representative one of the plurality of chip select mask registers (CSMR) is illustrated in FIG. 12-2. Each CSMR determines an address mask for each of the chip selects. Additionally, each CSMR determines a definition of the types of accesses which are allowed for the chip select signals.

In FIG. 12-2, the storage locations labeled BAM31 through BAM16 indicate a base address mask. This field defines a block of memory dedicated to each chip select through the use of address mask bits. The base address mask bits are logically inverted and "ANDed" with the upper bits of the base address stored in the aforementioned CSAR and the upper bits of the internal address bus. The two values are then compared to determine if the chip select address space is being accessed. When one of the base address mask bits is a logical one, this bit is disabled from a chip select address decode operation. When one of the base address mask bits is a logical zero, a corresponding address bit from the internal address bus is compared with a corresponding bit in the CSAR to determine a proper decode address. The CSMR bits labeled CPU, SC, SD, UC, and UD mask specific address spaces and place the chip select in a specific address space or spaces. In an address space that is disabled, an access to a location in that address space becomes a regular external bus access and no chip select is activated. The address space mask bits include a CPU space mask, a supervisor code address space mask (SC), a supervisor data address space mask (SD), a user code address space mask (UC), and a user data address space mask (UD). When one of the address space mask bits in the CSMR is a logic one value, the corresponding address space is disabled from the chip select activation and operation. If the address space is accessed when the corresponding address space mask bit is asserted, no chip select activation will occur and a non-chip select external cycle is generated. When one of the address bits in the CSMR is a logic zero value, the corresponding address space is enabled for the chip select operation. An access using the chip select may occur for this address space.

FIG. 12-3 illustrates a chip select control register (CSCR). Each CSCR is used to control internal automatic acknowledge termination, control external master automatic acknowledge termination, control chip select and write enable assertion and timing to indicate port size, and to indicate the burst capability of each of the chip selects.

During operation, a chip select zero (CS0) signal provides a global, or boot, chip select to an external integrated circuit pin. As the global chip select, CS0 allows address decoding for a boot ROM before system initialization occurs. Furthermore, the output of the CSO signal is different from any other chip select integrated circuit pin implemented on the present data processor. After a system reset operation, the CSO integrated circuit pin is asserted for every address. This capability allows the boot ROM to be located at any address in the external address space. The CSO integrated circuit pin operates in this manner under a corresponding CSMR (CSMR0) is written. Until that point, the port size and internal automatic acknowledge function of CSO are determined by the values provided on a plurality of integrated circuit pins sampled at reset negation. The following table, Table 1, illustrates the values used to select a port size for the chip select corresponding to CSO.

TABLE 1

| Integrated Circuit Pin A | Integrated Circuit Pin B | Boot CS0 Port Size |
| --- | --- | --- |
| 0 | 0 | 32-bit port |
| 0 | 1 | 8-bit port |
| 1 | 0 | 16-bit port |
| 1 | 1 | 16-bit port |

Table 2 illustrates the values to enable or disable an internal automatic acknowledge function in data processor 3. For CSO, upon system reset, both read and write transfer operations are enabled and bursting is disabled.

TABLE 2

| Integrated Circuit Pin C | Boot CS0 Internal Automatic Acknowledge |
| --- | --- |
| 0 | Disabled |
| 1 | Enabled with 15 wait states |

In FIG. 12-3, the wait states, WS[3:0] are valid when the AA (Automatic Acknowledge) field or EMAA (External Master Automatic Acknowledge) field is equal to a logic one value. When valid, the WS[3:0] field defines a number of wait states that will be inserted before a transfer acknowledge is generated. For an internal master initiated cycle, if an external transfer acknowledge is received before the indicated number of wait states is generated, the external transfer acknowledge will end the cycle.

The EMAA field controls the driving and assertion of a transfer acknowledge during external master initiated cycles that "hit" with a corresponding chip select address space. If the EMAA field is a logic one value, the transfer acknowledge from memory controller 804 will be set to an output and asserted at the time determined by the value WS[3:0]. Note that external transfer acknowledge (TA) termination from external bus master 205 must be disabled. When the EMAA is a logic zero value, an external transfer acknowledge signal from memory controller 804 is not driven during external master initiated bus cycles and external TA termination from external bus master 205 must be provided.

The AA field controls the assertion of the internal TA during internally initiated bus cycles that hit in the corresponding chip select address space. If the AA field is set to a logic one value, the internal TA will be asserted at the time determined by the WS[3:0] field. The Transfer Acknowledge signal from memory controller 804 is transferred at the package integrated circuit pin will be set to an input during all internally initiated cycles. When the AA field stores a logic zero value, the internal transfer acknowledge will not be generated until the Transfer Acknowledge termination is received from external bus master 205.

The PS[1:0] (Port Size) field specifies a width of the data associated with each chip select. The PS field determines where data will be driven during write cycles and where data will be sampled during read cycles. For example, if the PS field has a binary value of 00, the programmed port size is thirty-two bits and data will be sampled and driven on a plurality of integrated circuit pins labeled Data [31:0]. If the PS field has a binary value of 01, the programmed port size is eight bits and data will be sampled and driven on a plurality of integrated circuit pins labeled Data [31:24] only. If the PS field has a binary value of 10, the programmed port size is sixteen bits and data will be sampled and driven on a plurality of integrated circuit pins labeled Data [31:16] only. If the PS field has a binary value of 11, the programmed port size is sixteen bits and data will be sampled and driven on a plurality of integrated circuit pins labeled Data [31:16].

The BRST (Burst Enable) field indicates the "burstability" of the memory associated with each chip select. If the BRST field is set to a logic one value, all transfers to and from port sizes smaller than the requested transfer size will be "bursted." For example, longword transfers to eight and sixteen bit ports, word transfers to eight bit ports, and line transfers to eight, sixteen, and thirty-two bits ports will all be "bursted." When the BRST field has a logic zero value, all transfers which are larger than a specified port size will be separated into individual non-burst transfers that are no larger than the specified port size.

The ASET (Address Setup Enable) field controls the assertion of a chip select with respect to an indicator of address validity. When the ASET field is a logic zero value, the chip select is asserted when an address on the address bus is valid. When the ASET field is a logic one value, the chip select is asserted one cycle after the address on the address bus becomes valid.

The WRAH (Write Address Hold Enable) field controls an address hold time after a chip select and write enable are negated during a chip select write cycle. When the WRAH value is a logic zero value, an address is not held for any extra cycles during execution of a write operation. When the WRAH field is a logic one value, a address is held for one cycle after the transfer acknowledge is asserted during execution of a write operation.

The RDAH (Read Address Hold Enable) field controls the address hold time after a chip select signal is asserted during a chip select read cycle. When the RDAH value is a logic zero value, an address is not held for any extra cycles during execution of a read operation. When the RDAH field is a logic one value, a address is held for one cycle after the transfer acknowledge is asserted during execution of a read operation.

The WR (Write Enable) field controls the assertion of chip select and write enable signals on write cycles. When the WR field is a logic zero value, chip select signals are not activated during execution of a write operation. When the WR field is a logic one value, chip select signals are activated during execution of a write operation.

The RD (Read Enable) field controls the assertion of the chip select signal on read cycles. When the RD field is a logic zero value, the chip select signal are not activated during execution of a read operation. When the RD field is a logic one value, chip select signals are activated during execution of a read operation.

The plurality of control registers 810 also include a DRAM controller refresh register (DCRR), a DRAM controller timing register (DCTR), a plurality of DRAM controller address registers (DCAR0–DCAR1), a plurality of DRAM control mask registers (DCMR0"DCMR1), and a plurality of DRAM controller control registers (DCCR0–DCCR1).

The DCRR is illustrated in greater detail in FIG. 13-1. The DRAM controller refresh counter register controls a number of system clocks between refresh cycles. In FIG. 13-1, the Refresh Count field, RC11-RCO, controls the frequency of refresh requests by memory controller 804. The value stored in the Refresh Count field is multiplied by sixteen system clocks to determine a refresh period.

The DCTR, illustrated in greater detail in FIG. 13-2, controls timing for DRAM accesses for multiple banks of DRAM. The fields in this register modify the Row Address Strobe (RAS) and Column Address Strobe (CAS) bus for all types of DRAM accesses provided by Memory controller 804. In the DCTR, the Drive Address during External Master DRAM accesses (DAEM) field controls the output drivers of Memory controller 804 on all address lines during accesses of the DRAM by an external master. The portion of the address bus which is configured to output address signals may be driven to provide row and column address multiplexing for the external master. The DAEM field does not affect the driving of the address during internally initiated accesses to the DRAM. During operation, when the DAEM field is a logic zero value, no address signals are driven during external master DRAM accesses. Conversely, when the DAEM field is a logic one value, address signals are driven to provide row and column address multiplexing during external master DRAM accesses.

The EDO field (Extended Data Out) specifies whether the DRAM banks are populated with EDO DRAM and directs Memory controller 804 to assert the CAS bus for EDO time during a page mode access. Such a procedure allows memory controller 804 to take advantage of the special CAS timing allowed by EDO DRAMs.

The RCD (RAS to CAS Delay) field controls a number of system clocks between the assertion of the RAS signal and the assertion of the CAS bus. This field is valid only for page and non-page mode accesses. It does not control refresh cycles. When the RCD field has a logic level of zero, the RAS signal will assert one system clock before the assertion of the CAS bus. When the RCD field has a logic level of one, the RAS signal will assert two system clocks before the assertion of the CAS bus.

The RSH1–RSH0 (Non-Page Mode RAS Hold Time) field controls the number of system clocks that the RAS signal will remain asserted after the assertion of the CAS bus. This field controls the timing of the RAS signal during non-page mode read and write cycles. When this field has a binary value of 00, the RAS signal will negate one and a half system clocks after the assertion of the CAS bus. Similarly, when this field has a binary value of 01, the RAS signal will negate two and a half system clocks after the assertion of the CAS bus. Furthermore, when this field has a binary value of 10, the RAS signal will negate three and a half system clocks after the assertion of the CAS bus.

The CRP1–CRP0 (Non-Page Mode CAS to RAS Precharge Time) field controls a number of system clocks the RAS signal will remain negated after the negation of the CAS bus when the bus master requests back-to-back DRAM accesses. When the CRP field has a binary value of 00, the RAS signal will assert one and a half system clocks after the negation of the CAS bus. Similarly, when the CRP field has a binary value of 01, the RAS signal will assert two and a half system clocks after the negation of the CAS bus.

Additionally, when the CRP field has a binary value of 10, the RAS signal will assert three and a half system clocks after the negation of the CAS bus.

The CAS (Page Mode Column Address Strobe Timing) field, together with the EDO field, controls a minimum number of system clocks that CAS will be held active during a page mode DRAM access. Table 3 indicates the relationship between the CAS and EDO fields.

TABLE 3

| CAS | EDO | CAS Active Time (Number of System Clocks) |
|---|---|---|
| 0 | 0 | 1.5 |
| 0 | 1 | 1.0 |
| 1 | 0 | 2.5 |
| 1 | 1 | 2.0 |

The CP (CAS Precharge Timing) field, together with the EDO field, controls a number of system clocks that the CAS bus will be held inactive after a DRAM Access. This field controls the CAS bus inactive timing after page mode read and write cycles only. Table 4 illustrates the relationship between the CP and EDO fields.

TABLE 4

| CAS | EDO | CAS Active Time (Number of System Clocks) |
|---|---|---|
| 0 | 0 | 0.5 |
| 0 | 1 | 1.0 |
| 1 | 0 | 1.5 |
| 1 | 1 | 2.0 |

The CSR (CAS Setup Time for CAS Before RAS Refresh) field controls the number of system clocks between the assertion of the CAS bus and the assertion of the RAS cycle during refresh cycles only. When the CSR field is a logic zero value, the CAS bus will assert one system clock before the assertion of the RAS signal. When the CSR field is a logic one value, the CAS bus will assert two system clocks before the assertion of the RAS signal.

A representative one of the plurality of DRAM controller address registers (DCAR) is illustrated in FIG. 13-3. Each DRAM controller address register stores a base address of a memory dedicated to each DRAM bank. These bits are compared to the upper bits of an internal address bus to determine if the DRAM bank is being accessed.

A representative one of the plurality of DRAM controller mask registers (DCMR) is illustrated in FIG. 13-4. Each DCMR determines an address mask for each of the DRAM banks. Additionally, each DCMR determines a definition of the types of accesses which are allowed for these signals.

In FIG. 13-4, the storage locations labeled BAM31 through BAM17 indicate a base address mask. This field defines a block of memory dedicated to each DRAM bank through the use of address mask bits. The base address mask bits are logically inverted and "ANDed" with the upper bits of the base address stored in the aforementioned DCAR and the upper bits of the internal address bus. The two values are then compared to determine if the DRAM bank address space is being accessed. When one of the base address mask bits is a logical one, this bit is disabled from a DRAM bank address decode operation. When one of the base address mask bits is a logical zero, a corresponding address bit from the internal address bus is compared with a corresponding bit in the DCAR to determine a proper decode address. The DCMR bits labeled SC, SD, UC, and UD mask specific address spaces and place the DRAM bank in a specific address space or spaces. In an address space that is disabled, an access to a location in that address space becomes a non-DRAM external bus access and no DRAM is activated. The address space mask bits include an a supervisor code address space mask (SC), a supervisor data address space mask (SD), a user code address space mask (UC), and a user data address space mask (UD). When one of the address space mask bits in the DCMR is a logic one value, the corresponding address space is disabled from DRAM activation and operation. If the address space is accessed when the corresponding address space mask bit is asserted, no DRAM activation will occur and an external non-DRAM cycle is generated. When one of the address mask bits in the DCMR is a logic zero value, the corresponding address space is enabled for the DRAM operation. An access using the DRAM can occur for this address space.

Figure 5:
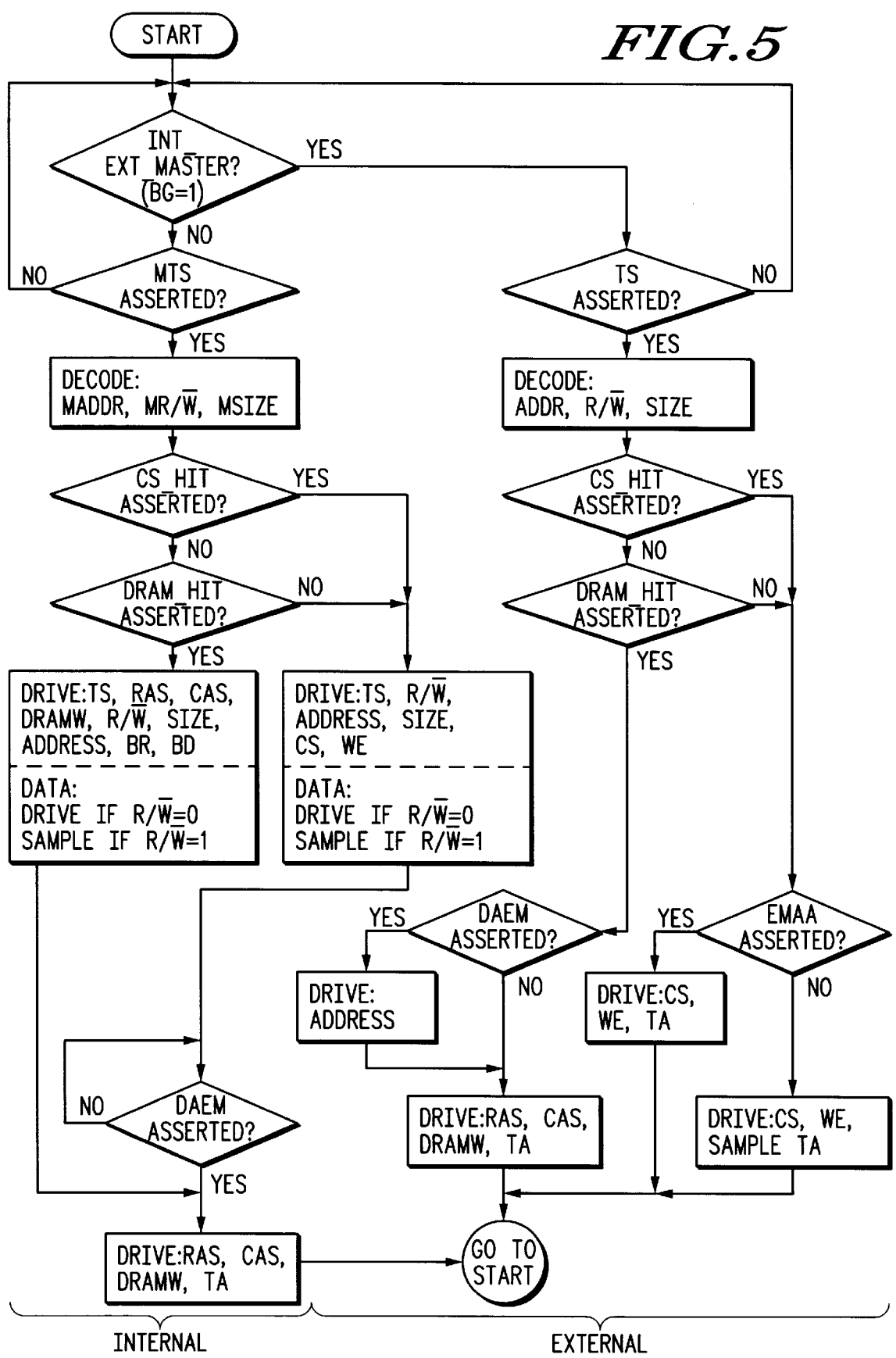
FIG. 5 illustrates in flow chart form a function performed by the system bus controller of FIG. 4.

FIG. 13-5 illustrates a DRAM controller control register (DCCR). Each DCCR is used to control the port size, page size, page mode and activation of each of the DRAM banks implemented in a data processing system. In the DCCR, the PS[1:0] (Port Size) field specifies the data width associated with the DRAM address space. When the PS field has a binary value of 00, the programmed port size is thirty-two bits and data will be sampled and driven on a plurality of integrated circuit pins labeled Data [31:0]. If the PS field has a binary value of 01, the programmed port size is eight bits and data will be sampled and driven on a plurality of integrated circuit pins labeled Data [31:24] only. If the PS field has a binary value of 10, the programmed port size is sixteen bits and data will be sampled and driven on a plurality of integrated circuit pins labeled Data [31:16] only. If the PS field has a binary value of 11, the programmed port size is sixteen bits and data will be sampled and driven on a plurality of integrated circuit pins labeled Data [31:16] only.

The BPS[1:0] Bank Page Size field defines the page size for each DRAM bank when page mode DRAMs are used. When the BPS field has a binary value of 00, the page size is defined as a 512 byte page. When the BPS field has a binary value of 01, the page size is defined as a 1 Kbyte page. Similarly, when the BPS field has a binary value of 10, the page size is defined as a 2Kbyte page.

The port size (PS[1:0]) and the bank page size (BPS[1:0]) are used together to determine the multiplexing of the address bus during the column address phase of a DRAM cycle. The address bus multiplexing for all combinations of port size and bank page size is illustrated in FIG. 14-1 through 14-3.

The PM[1:0] (Page Mode Select) field selects the type of page mode access allowed for each DRAM bank. When the PM field has a binary value of 00, no page mode accesses are allowed. When the PM field has a binary value of 01, a page mode access is allowed on burst accesses. Additionally, when the PM field has a binary value of 11, a normal page mode of operation is allowed.

The WR (Write Enable) field controls the assertion of DRAM control signals on write cycles. When the WR field has a logic zero value, the DRAM control signals are not activated during a write operation. When the WR field has a logic one value, the DRAM control signals are activated during the write operation.

The RD (Read Enable) field controls the assertion of DRAM control signals on read cycles. When the RD field has a logic zero value, the DRAM control signals are not activated during a read operation. When the RD field has a logic one value, the DRAM control signals are activated during the read operation.

Description of Operation

As illustrated in FIG. 2, during operation of the present invention, external bus master 205 is able to access DRAM 207 using a memory controller internal to data processor 3 without the use of external multiplexers or any other external circuitry required by prior art data processing systems. The present invention removes the need for external multiplexers and even a dedicated integrated circuit pin for providing external multiplexing control during external master initiated DRAM accesses by implementing a unique circuit and technique for multiplexing row and column addresses of the DRAM internally within data processor 3.

During such an external access, external bus master 205 initiates a data transfer operation by asserting a transfer start (TS) signal, a Size bus, and a read/write (R/$\overline{W}$) signal to data processor 3 of the present invention. External bus master 205 also provides an address value to data processor 3. During an initial timing cycle, the access information including the TS, R/$\overline{W}$, Size, and address signals are stored by a memory controller (not illustrated in FIG. 2) implemented in data processor 3 of the present invention. During a next timing cycle following the assertion of the TS signal, external bus master 205 tri-states the address bus. During the same timing cycle, the memory controller implemented in data processor 3 begins to reinforce the aforementioned address value onto an external address bus and asserts a RAS (Row Address Strobe) signal. At an appropriate point in time determined by a plurality of programmable control bits, the memory controller then provides a column address and asserts a CAS (Column Address Strobe) signal. This aspect of operation of the present invention will subsequently be discussed in greater detail with respect to the accompanying figures.

Furthermore, the present invention removes the need for providing external generation of chip select and write enable signals when external bus master 205 uses the internal chip select and write enables signals generated by the memory controller internal to data processor 3. A user may program data processor 3 such that external master chip select accesses can be either the same as the internal master accesses, or program either the internal or external master accesses to use an externally generated transfer acknowledge. As such, the user can turn off the internal transfer acknowledge logic and add external transfer acknowledge logic while still using the internal chip select and write enable generation logic. The internal transfer acknowledge logic can be turned off for either internal or external master initiated cycles, independent of the use by the other master. This feature is user programmable on a chip select basis. The flexibility provided by this aspect of the present invention allows the user to compensate for the different timings of external master accesses without requiring external chip select and write enable logic. Therefore, overhead is conserved and efficiency is increased in this embodiment of the present invention.

As well, the circuit and method of the present invention allow external bus master 205 to access a chip-selectable device using a different number of wait states than an internal master (data processor 3) without the addition of external control circuitry. To allow the external master to access the memory using chip select circuitry internal to data processor 3, using a different number of wait states than the internal master, the present invention allows a register bit to be programmed such that the internal chip select circuitry will not assert a transfer acknowledge signal on external accesses. Therefore, during external accesses, the chip select logic of data processor 3 will wait for an externally generated transfer acknowledge signal before negating the internally generated chip select and write enable signals. This aspect of the present invention reduces the amount of external logic required when the number of wait states is different between internal and external masters.

Although the unique circuitry and techniques implemented by the present invention will subsequently be discussed in greater detail, a general description of operation of the present invention will now be provided.

FIG. 3 illustrates data processor 3 in greater detail. During operation of data processor 3, core 9 uses K-Bus 25 to connect CPU 2, MMU/Controller 4, and memory 6. In the present embodiment of the invention, K-Bus 25 is a high speed, single-cycle access bus. Memory 6 may include random access memory (RAM), read only memory (ROM), cache blocks, FLASH memory, internal DRAM, and any combination thereof. All other system modules and peripherals are coupled to core 9 via M-Bus 23. M-Bus 23 is an internal multi-master bus which is used to perform data transfers initiated by one of multiple bus masters. System bus controller 8 provides multiple functions. System Bus controller 8 provides an interface between internal M-Bus 23 and the external E-Bus. Additionally, system bus controller 8 serves as a focal point for controlling all data transfers on the S-bus. The S-Bus is used to connect slave peripheral modules (12 and 13) such as timers and serial communication channels into data processor 3.

In the present invention, core 9 is interconnected with a high-speed, single cycle K-Bus 25 to maximize performance. For transfers not directly coupled to this high-speed bus, M-Bus 23 provides bandwidth from any of the internal bus masters such as core 9 and master module 14. System bus controller 8 provides a connection between the internal M-Bus 23 and the external E-Bus, while also providing a control function for all data transfers on the low-cost, lower bandwidth S-Bus for slave peripheral modules such as slave modules 12 and 13.

The DRAM controller which allows an external bus master, such as element 205 of FIG. 2, to control an external memory through the internal control mechanisms of data processor 3 is implemented in system bus controller 8. A portion of system bus controller 8 is illustrated in greater detail in FIG. 4.

During a chip selectable device access operation of data processing system 202, external bus master 205 (illustrated FIG. 2) initiates a data transfer request by asserting a TS (Transfer Start) signal, providing a proper address value which corresponds to the desired data, providing a R/W signal which indicates whether the data value should be read or written, and by providing a Size bus. Refer to FIGS. 4 and 5 for a more detailed illustration of the circuitry and flow description used to implement the current invention.

When the TS signal, the address value, the R/W signal, and the Size bus are output by external bus master 205, they are stored in decode and address generation circuit 808 (illustrated in FIG. 4). Bus arbitration circuit 806 (illustrated in FIG. 4) determines when data processor 3 may control the E-bus. When the BG and BD signals are negated, an external device can control the E-bus and bus arbitration circuit 806 asserts the int_ext_master signal. BD will be negated by bus arbitration circuit 806 to indicate the internal master is not driving the E-bus. BR will be asserted when the internal master requires mastership of the E-bus. Thus, when external bus master 205 asserts the appropriate control signals to indicate that an access to DRAM 207 or memory 206 is desired, bus arbitration circuit 806 examines the value of the BG signal and determines it is negated, then bus arbitration circuit 806 asserts the int_ext_master signal. As previously mentioned, the int_ext_master signal is provided both to memory controller 804 and decode and address generation circuit 808.

Subsequently, decode and address generation circuit 808 determines whether the Transfer Start (TS) signal has been asserted by external bus master 205. If the TS signal has been asserted, decode and address generation circuit 808 decodes the address value, the R/W signal, and the Size bus to determine which device in data processing system 202 is to be accessed. Decode and address generation circuit 808 asserts the DRAM_hit signal to indicate that the address provided thereto accesses a memory location in DRAM 207. Similarly, decode and address generation circuit 808 asserts the CS_hit signal to indicate that the address provided thereto accesses a chip selectable external device such as memory 206. It should be understood that while only memory 206 is illustrated in the present embodiment of the invention, other chip selectable devices may also be implemented instead or in addition to memory 206. In a system containing a plurality of chip-selectable devices, the CS_hit signal would assert to indicate that the address provided to decode and address generation circuit 808 when any of these devices is accessed. Furthermore, it should be noted that memory 206 may be implemented as any type of external memory such as SRAM, ROM, EEPROM, EPROM, and FLASH, or any chip selectable device such as a serial interface or a timer.

DRAM Access by External Master

FIG. 5 should be referenced during a following description of an access of DRAM 207 by external bus master 205.

If the DRAM_hit signal is asserted to indicate that a memory location in DRAM 207 has been accessed, memory controller 804 then determines if the DAEM (Drive Address during External Master DRAM accesses) bit in the DCTR register (illustrated in FIG. 13-2) of control registers 810 has been programmed by an external user to enable the output drivers of memory controller 804 on all address lines during accesses of DRAM 207 by external bus master 205. If the DAEM field is set (a logic one in the present embodiment of the invention), then memory controller 804 enables decode and address generation circuit 808 to drive an address which reflects a row address out of the address bus portion of the E-bus. One-half timing cycle later, the RAS signal is asserted by memory controller 804. Subsequently, after a period of time determined by the RCD field in the DCTR, decode and address generation circuit 808 drives a new address which reflects a column address, formed by decode and address generation circuit 808 as described in FIGS. 14-1 through 14-3, out the address portion of the E-bus. One-half timing cycle later, the CAS bus is asserted by memory controller 804. Furthermore, if it is a write access of DRAM 207, the DRAMW signal is asserted and if it is a read access of DRAM 207, the DRAMW signal is negated. Additionally, memory controller 804 asserts the TA (Transfer Acknowledge) signal to external bus master 205 when the access of DRAM 207 is completed.

FIGS. 6 through 9 provide timing diagrams which illustrate the timing which is implemented by memory controller 804 in several embodiments of the present invention.

Figure 6:
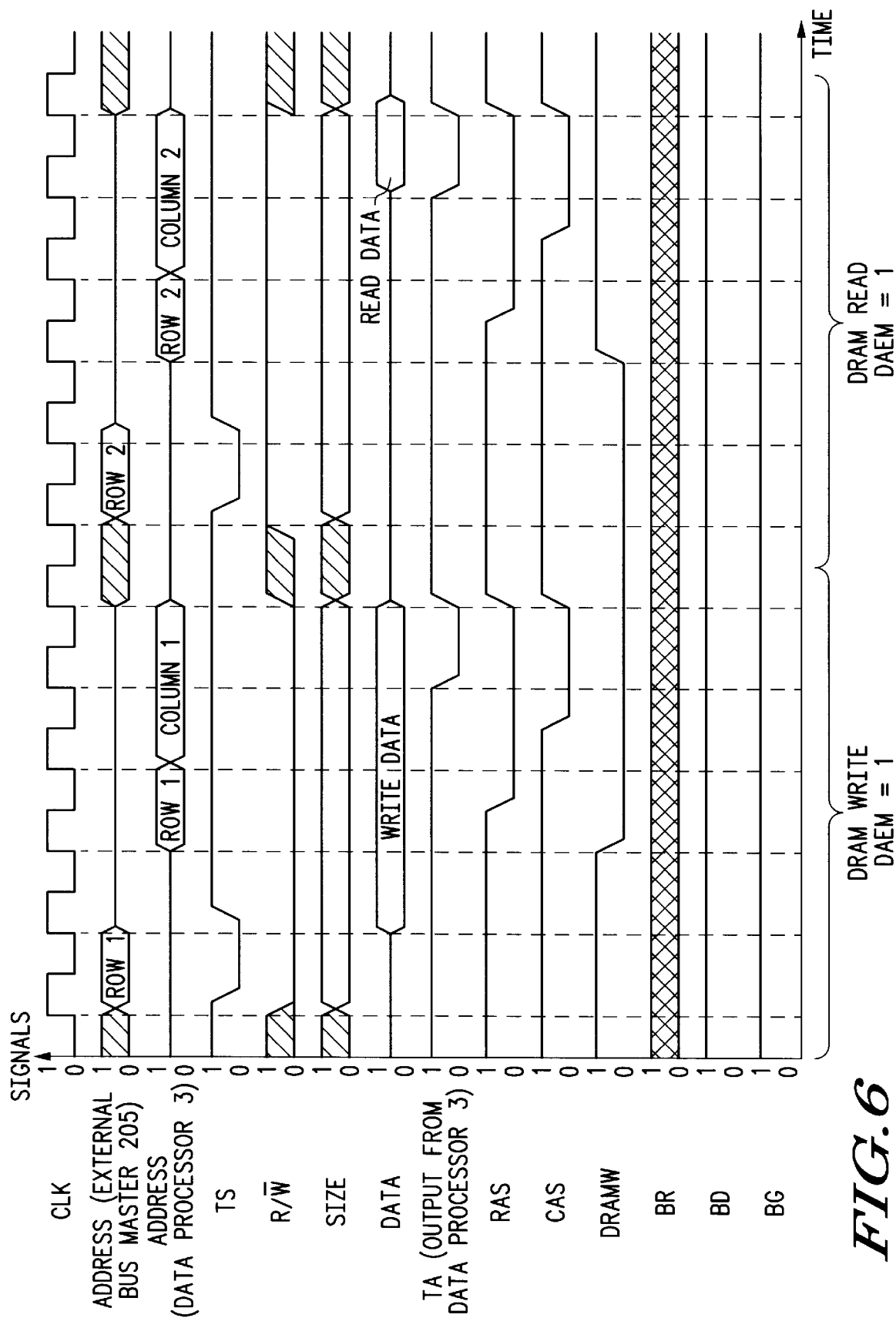
FIG. 6 illustrates in timing diagram form a first example of an external master initiated access of a DRAM circuit in accordance with the present invention.

FIG. 6 illustrates a first embodiment of the present invention in which DRAM 207 is first written and then read and the DAEM field in the DCTR of control registers 810 is asserted to indicate that the address values provided should be driven. In FIG. 6, the Clk (Clock) signal is provided. The generation, use, and routing of a clock signal in a data processing system are well known in the art and will not be discussed in further detail. As illustrated in FIG. 6, external bus master 205 provides an address value, a Transfer Start (TS) signal, a R/W signal, and a Size bus to data processor 3 during a first timing cycle. Note, that in the first portion of this timing example, the R/W signal is negated to indicate that data processor 3 is writing a data value to DRAM 207.

One timing cycle after external bus master 205 has transferred the address value, external bus master 205 negates the TS signal, tri-states the address, and drives data to be written.

One timing cycle after the TS signal is negated, decode and address generation circuit 808 of a portion of system bus controller 8 outputs the address previously driven by external bus master 205 as the row address required to access the memory location in DRAM 207. When decode and address generation circuit 808 provides the address to DRAM 207, memory controller 804 also asserts the DRAMW signal to indicate that a write operation is being executed. One half timing cycle later, memory controller 804 asserts the RAS signal to indicate to DRAM 207 that the address being provided thereto is a row address.

After the address is provided for one timing cycle, decode and address generation circuit 808 provides a new address value, a portion of which is a column address to DRAM 207 via the same integrated circuit pins which provided the row address to DRAM 207. One half timing cycle later, after decode and address generation circuit 808 provides the new address value, memory controller 804 asserts the CAS bus to indicate to DRAM 207 that the address being provided thereto is a column address.

One half timing cycle later, memory controller 804 asserts the TA signal to external bus master 205 to indicate an end of the bus access.

One timing cycle after the TA signal is asserted, memory controller 805 negates the RAS signal, CAS bus, and the TA signal. Additionally, the address and data values provided to DRAM 207 are tri-stated.

Subsequently, a DRAM read operation is executed and the timing thereof is illustrated in FIG. 6. As illustrated in FIG. 6, external bus master 205 provides an address value, a Transfer Start (TS) signal, a R/W signal, and a Size bus to data processor 3 during a first timing cycle. Note, that in the first portion of this timing example, the R/W signal is asserted to indicate that data processor 3 is reading a data value from DRAM 207.

One timing cycle after external bus master 205 has transferred the address value, the TS signal is negated and the address bus is tri-stated by external bus master 205.

One timing cycle after the TS signal is negated, decode and address generation circuit 808 of a portion of system bus controller 8 outputs the address value previously driven by external bus master 205 as the row address required to access the memory location in DRAM 207. When decode and address generation circuit 808 provides the address to DRAM 207, memory controller 804 negates the DRAMW signal to indicate that a read operation is being executed.

One half timing cycle after decode and address generation circuit 808 provides the address, memory controller 804 asserts the RAS signal to indicate to DRAM 207 that the address being provided thereto is a row address.

After the address is provided for one timing cycle, decode and address generation circuit 808 provides a new address value, a portion of which is a column address, to DRAM 207 via the same integrated circuit pins which provided the row address to DRAM 207.

One half timing cycle after decode and address generation circuit 808 provides the new address, memory controller 804 asserts the CAS bus to indicate to DRAM 207 that the address being provided thereto is a column address.

One half timing cycle later, memory controller 804 asserts the TA signal to indicate an end of the bus access. When the TA signal is first negated, the data provided by DRAM 207 via the E-bus is valid and may be used by external bus master 205 without error.

When the TA signal is asserted after one clock cycle, the RAS signal, CAS bus, and TA signal are negated. Additionally, the address, provided by memory controller 804, and the data provided by DRAM 207 are tri-stated.

Figure 7:
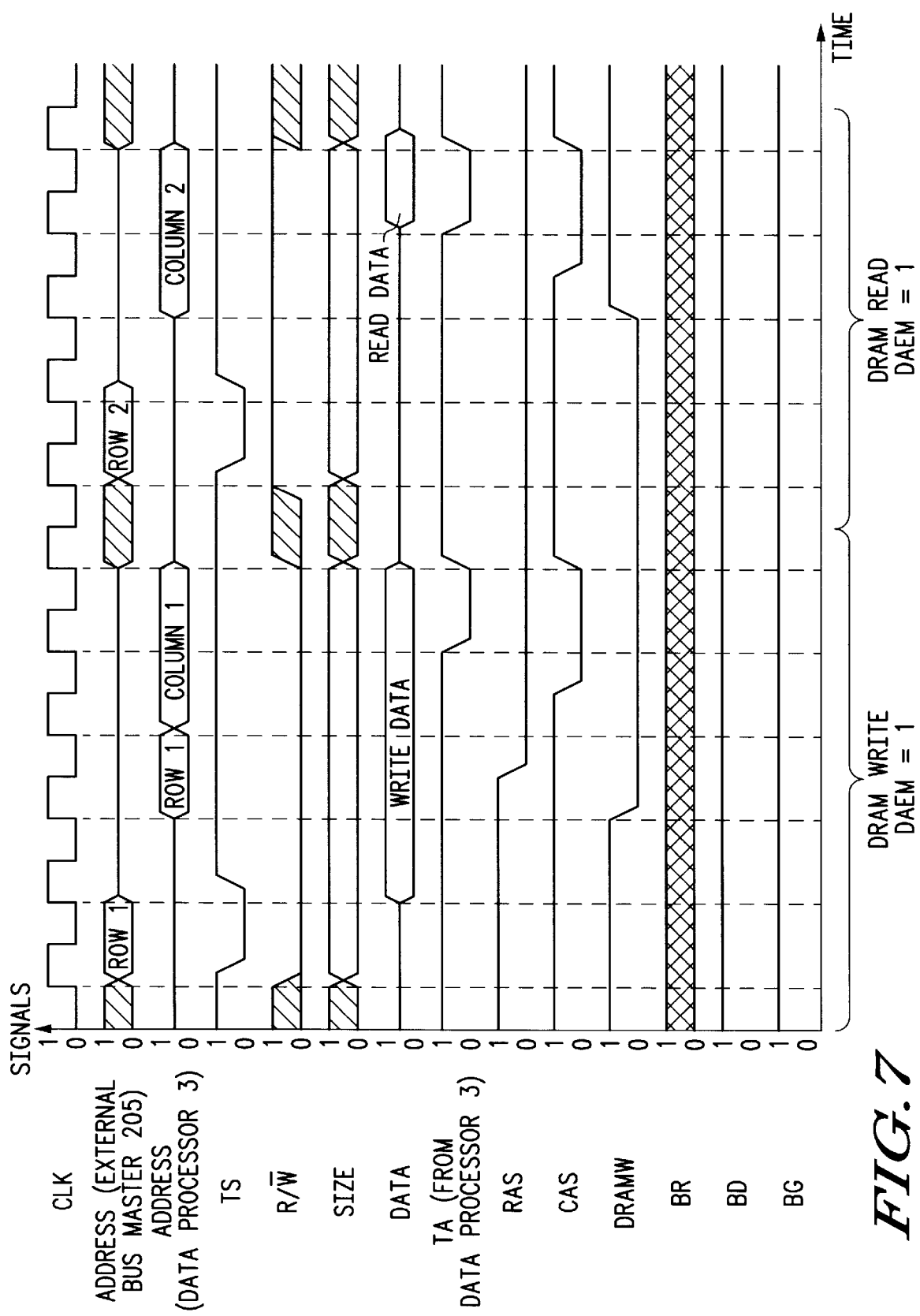
FIG. 7 illustrates in timing diagram form a second example of an external master initiated full page access of a DRAM circuit in accordance with the present invention.

FIG. 7 illustrates a second embodiment of the present invention in which DRAM 207 is first written and then read and the DAEM field in the DCTR of control registers 810 is asserted to indicate that the address values provided should be driven. In FIG. 7, the Clk (Clock) signal is provided. The generation, use, and routing of a clock signal in a data processing system are well known in the art and will not be discussed in further detail. As illustrated in FIG. 7, external bus master 205 provides an address value, a Transfer Start (TS) signal, a R/W signal, and a Size bus to data processor 3 during a first timing cycle. Note, that in the first portion of this timing example, the R/W signal is negated to indicate that data processor 3 is writing a data value to DRAM 207.

One timing cycle after external bus master 205 has transferred the address value, external bus master 205 negates the TS signal, tri-states the address, and drives data to be written.

One timing cycle after the TS signal is negated, decode and address generation circuit 808 of a portion of system bus controller 8 outputs the address previously driven by external bus master 205 as the row address required to access the memory location in DRAM 207. When decode and address generation circuit 808 provides the address to DRAM 207, memory controller 804 also asserts the DRAMW signal to indicate that a write operation is being executed. One half timing cycle later, memory controller 804 asserts the RAS signal to indicate to DRAM 207 that the address being provided thereto is a row address.

After the address is provided for one timing cycle, decode and address generation circuit 808 provides a new address value, a portion of which is a column address to DRAM 207 via the same integrated circuit pins which provided the row address to DRAM 207. One half timing cycle later, after decode and address generation circuit 808 provides the new address value, memory controller 804 asserts the CAS bus to indicate to DRAM 207 that the address being provided thereto is a column address.

One half timing cycle later, memory controller 804 asserts the TA signal to external bus master 205 to indicate an end of the bus access.

One timing cycle after the TA signal is asserted, memory controller 804 negates the CAS bus and TA signal. Additionally, the address and data values provided to DRAM 207 are tri-stated. Note the RAS signal remains asserted while the subsequent address on the page is accessed. The RAS signal remains asserted until:

(1) An address for the current DRAM bank is not on the same page or row;

(2) An access to the other DRAM bank occurs; or (3) A refresh operation occurs.

Subsequently, a DRAM read operation is executed and the timing thereof is illustrated in FIG. 7. As illustrated in FIG. 7, external bus master 205 provides an address value, a Transfer Start (TS) signal, a R/W signal, and a Size bus to data processor 3 during a first timing cycle. Note, that in the first portion of this timing example, the R/W signal is asserted to indicate that data processor 3 is reading a data value from DRAM 207.

One timing cycle after external bus master 205 has transferred the address value, the TS signal is negated and the address bus is tri-stated by external bus controller 205.

One timing cycle after the TS signal is negated, decode and address generation circuit 808 provides a new address value, a portion of which is a column address, to DRAM 207 via the same integrated circuit pins which provided the row address to DRAM 207.

One half timing cycle after decode and address generation circuit 808 provides the new address, memory controller 804 asserts the CAS bus to indicate to DRAM 207 that the address being provided thereto is a column address.

One half timing cycle later, memory controller 804 asserts the TA signal to indicate an end of the bus access. When the TA signal is first negated, the data provided by DRAM 207 via the E-bus is valid and may be used by external bus master 205 without error. When the TA signal is asserted after one clock cycle, the CAS bus and the TA signal are negated. Additionally, the address, provided by memory controller 804, and the data provided by DRAM 207 are tri-stated.

Figure 8:
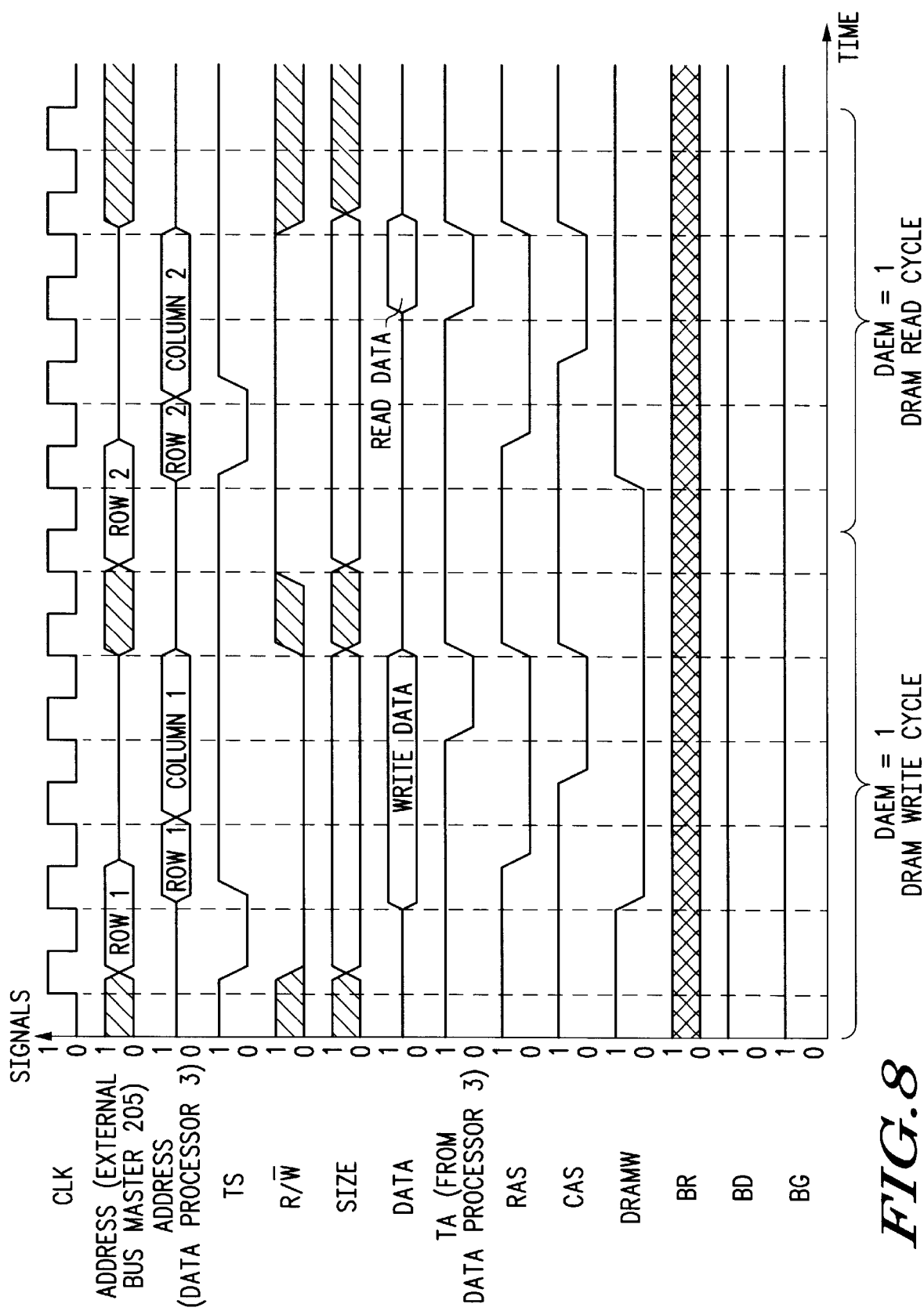
FIG. 8 illustrates in timing diagram form a third example of an external master initiated access of a DRAM circuit in accordance with the present invention.

FIG. 8 illustrates a third embodiment of the present invention in which DRAM 207 is first written and then read and the DAEM field in the DCTR of control registers 810 is asserted to indicate that the address values provided should be driven. In FIG. 8, the Clk (Clock) signal is provided. The generation, use, and routing of a clock signal in a data processing system are well known in the art and will not be discussed in further detail. As illustrated in FIG. 8, external bus master 205 provides an address value, a Transfer Start (TS) signal, a R/W signal, and a Size bus to data processor 3 during a first timing cycle. Note, that in the first portion of this timing example, the R/W signal is negated to indicate that data processor 3 is writing a data value to DRAM 207.

One timing cycle after external bus master 205 has transferred the address value, external bus master 205 negates the TS signal, tri-states the address, and drives data to be written. When the TS signal is negated, decode and address generation circuit 808 of a portion of system bus controller 8 reinforces the address driven by external bus master 205 as the row address required to access the memory location in DRAM 207. When decode and address generation circuit 808 provides the address to DRAM 207, memory controller 804 also asserts the DRAMW signal to indicate that a write operation is being executed. One half timing cycle later, memory controller 804 asserts the RAS signal to indicate to DRAM 207 that the address being provided thereto is a row address.

After the address is provided for one timing cycle, decode and address generation circuit 808 provides a new address value, a portion of which is a column address to DRAM 207 via the same integrated circuit pins which provided the row address to DRAM 207. One half timing cycle later, after decode and address generation circuit 808 provides the new address value, memory controller 804 asserts the CAS bus to indicate to DRAM 207 that the address being provided thereto is a column address.

One half timing cycle later, memory controller 804 asserts the TA signal to external bus master 205 to indicate an end of the bus access.

One timing cycle after the TA signal is asserted, memory controller 805 negates the RAS signal, CAS bus, and the TA signal. Additionally, the address and data values provided to DRAM 207 are tri-stated.

Subsequently, a DRAM read operation is executed and the timing thereof is illustrated in FIG. 8. As illustrated in FIG. 8, external bus master 205 provides an address value, a Transfer Start (TS) signal, a R/W signal, and a Size bus to data processor 3 during a first timing cycle. Note, that in the first portion of this timing example, the R/W signal is asserted to indicate that data processor 3 is reading a data value from DRAM 207.

One timing cycle after external bus master 205 has transferred the address value, the TS signal and the address bus are negated. When the TS signal is negated, decode and address generation circuit 808 of a portion of system bus controller 8 reinforces the address value driven by external bus master 205 as the row address required to access the memory location in DRAM 207. When decode and address generation circuit 808 provides the address to DRAM 207, memory controller 804 negates the DRAMW signal to indicate that a read operation is being executed.

One half timing cycle after decode and address generation circuit 808 provides the address, memory controller 804 asserts the RAS signal to indicate to DRAM 207 that the address being provided thereto is a row address.

After the address is provided for one timing cycle, decode and address generation circuit 808 provides a new address value, a portion of which is a column address, to DRAM 207 via the same integrated circuit pins which provided the row address to DRAM 207.

One half timing cycle after decode and address generation circuit 808 provides the new address, memory controller 804 asserts the CAS bus to indicate to DRAM 207 that the address being provided thereto is a column address.

One half timing cycle later, memory controller 804 asserts the TA signal to indicate an end of the bus access. When the TA signal is first negated, the data provided by DRAM 207 via the E-bus is valid and may be used by external bus master 205 without error. When the TA signal is asserted after one clock cycle, the RAS signal, CAS bus, and TA signal are negated. Additionally, the address, provided by memory controller 804, and the data provided by DRAM 207 are tri-stated.

Figure 9:
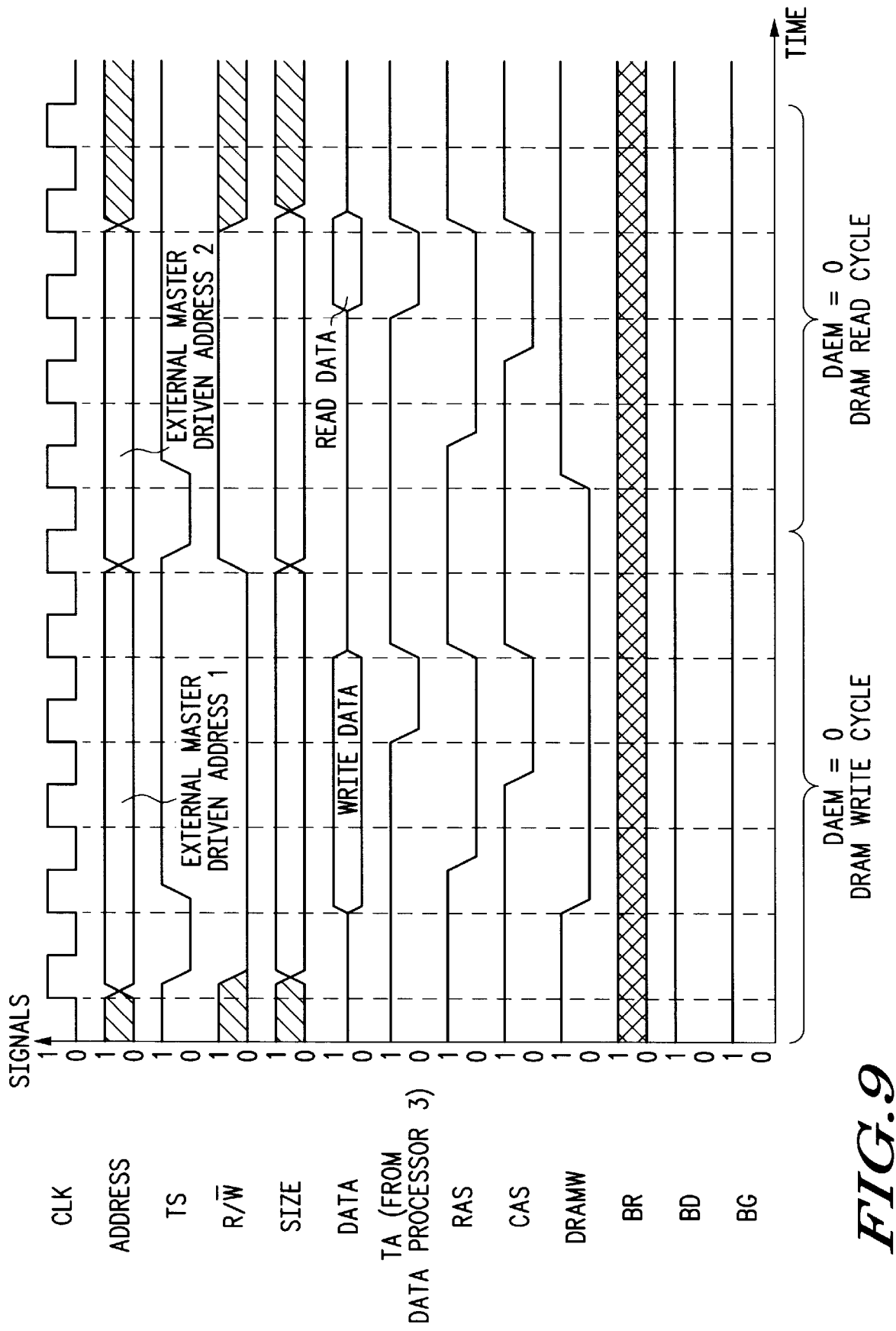
FIG. 9 illustrates in timing diagram form a fourth example of an external master initiated access of a DRAM circuit in accordance with the present invention.

FIG. 9 illustrates a case in which the DAEM field of the DCTR in control registers 810 is not asserted. When the DAEM field is not asserted, a designer of data processing system 202 would be required to implement a multiplexer such as that required in prior art systems. By allowing a designer to choose whether or not to implement an external multiplexer, the present invention provides greater flexibility.

FIG. 9 illustrates a fourth embodiment of the present invention in which DRAM 207 is first written and then read and the DAEM field in the DCTR of control registers 810 is negated to indicate that the address should not be driven by decode and address generation circuit 808. In FIG. 9, the Clk (Clock) signal is provided. The generation, use, and routing of a clock signal in a data processing system are well known in the art and will not be discussed in further detail. As illustrated in FIG. 9, external bus master 205 provides an address value, a Transfer Start (TS) signal, a R/W signal, and a Size bus to data processor 3 during a first timing cycle.

Note, that in the first portion of this timing example, the R/$\overline{\text{W}}$ signal is negated to indicate that data processor 3 is writing a data value to DRAM 207.

One timing cycle after external bus master 205 has transferred the address value, external bus master 205 negates the TS signal and drives data to be written. One half timing cycle later, memory controller 804 asserts the RAS signal to indicate to DRAM 207 that the address being provided thereto is a row address.

One timing cycle later, memory controller 804 asserts the CAS bus to indicate to DRAM 207 that the address being provided thereto is a column address.

One half timing cycle later, memory controller 804 asserts the TA signal to external bus master 205 to indicate an end of the bus access.

One timing cycle after the TA signal is asserted, memory controller 805 negates the RAS signal, CAS bus, and TA signal. Additionally, the address and data values provided to DRAM 207 are tri-stated.

Subsequently, a DRAM read operation is executed and the timing thereof is illustrated in FIG. 9. As illustrated in FIG. 9, external bus master 205 provides an address value, a Transfer Start (TS) signal, a R/$\overline{\text{W}}$ signal, and a Size bus to data processor 3 during a first timing cycle. Note, that in the first portion of this timing example, the R/$\overline{\text{W}}$ signal is asserted to indicate that data processor 3 is reading a data value from DRAM 207.

One timing cycle after external bus master 205 has transferred the address value, the TS signal is negated.

One half timing cycle later, memory controller 804 asserts the RAS signal to indicate to DRAM 207 that the address being provided thereto is a row address.

One timing cycle later, memory controller 804 asserts the CAS bus to indicate to DRAM 207 that the address being provided thereto is a column address.

One half timing cycle later, memory controller 804 asserts the TA signal to indicate an end of the bus access. When the TA signal is first negated, the data provided by DRAM 207 via the E-bus is valid and may be used by external bus master 205 without error. When the TA signal is asserted after one clock cycle, the RAS signal, CAS bus, and TA signal are negated. Additionally, the data provided by DRAM 207 is tri-stated.

In each of FIGS. 6 through 9, the column address is provided to DRAM 207 when the CAS bus is asserted. An example of address values which result from operation of the present invention are illustrated in FIGS. 14-1 through 14-3. Each of these figures illustrates the multiplexing required when different port sizes are implemented in the DRAM accessed during operation of the circuit and method disclosed in the present invention.

From the previous description of execution of a DRAM access by an external bus master through block diagrams, flow charts, and timing diagrams, an apparatus and method for communicating information between a data processor, an external memory, and an external master has been illustrated. In summation of this portion of the present invention, a circuit and method of operation are provided for controlling an external memory in a data processing system such that no external circuitry is required for performing a multiplexing function during a DRAM circuit access. Furthermore, through the use of internal multiplexing in data processor 3 and use of the CAS bus, the present invention removes a need for external multiplexers and a dedicated integrated circuit pin on a data processor for dynamic random access memory (DRAM) accesses by an external master device. The present invention implements the multiplexing function required to access DRAM circuits without requiring a dedicated integrated circuit pin such as that required by the prior art data processing systems as illustrated in FIG. 1. The increased flexibility and decreased integrated circuit pin requirements of the data processor of the present invention result in a data processing system which has lower system costs and may be easily updated to take advantage of the latest advances in the semiconductor market.

Chip Selectable Access by External Master

Referring back to FIG. 5, another aspect of the present invention will be described in greater detail. If the CS__hit signal is asserted to indicate that a location in a chip selectable device, such as memory 206, has been accessed, memory controller 804 then determines if the EMAA (External Master Automatic Acknowledge) field in the CSCR register (illustrated in FIG. 12-3) of control registers 810 has been programmed by an external user to control the output and assertion of a transfer acknowledge during access operations initiated by external bus master 205 to another memory device. If the EMAA field is asserted (a logic one in the present embodiment of the invention), then memory controller 804 negates the Transfer Acknowledge (TA) signal for a length of time determined by the wait state value (WS[3:0]) programmed in the CSCR register of FIG. 12-3 and then asserts the TA signal for one clock cycle. Chip select registers, such as the CSCR, correspond to a given address space. The implementation and use of chip select registers is well known in the data processing art and will not be described in greater detail.

When the EMAA field is asserted, memory controller 804 provides the CS (Chip Select) signal, WE (Write Enable) bus, and the TA (Transfer Acknowledge) signal to provide control for memory 206. Through the use of these signals, data processor 3 is effectively providing control of memory 206 for external bus master 205. Conversely, when the EMAA field is negated, memory controller 804 provides only the CS (Chip Select) signal and WE (Write Enable) bus. Rather than providing the TA (Transfer Acknowledge) signal to provide control for memory 206, memory controller 804 samples a TA signal provided externally by external bus master 205 or another external circuit (not illustrated herein).

FIGS. 10, 11, 15, and 16 provide timing diagrams which illustrate the timing which is implemented by memory controller 804 in several embodiments of the present invention.

Figure 10:
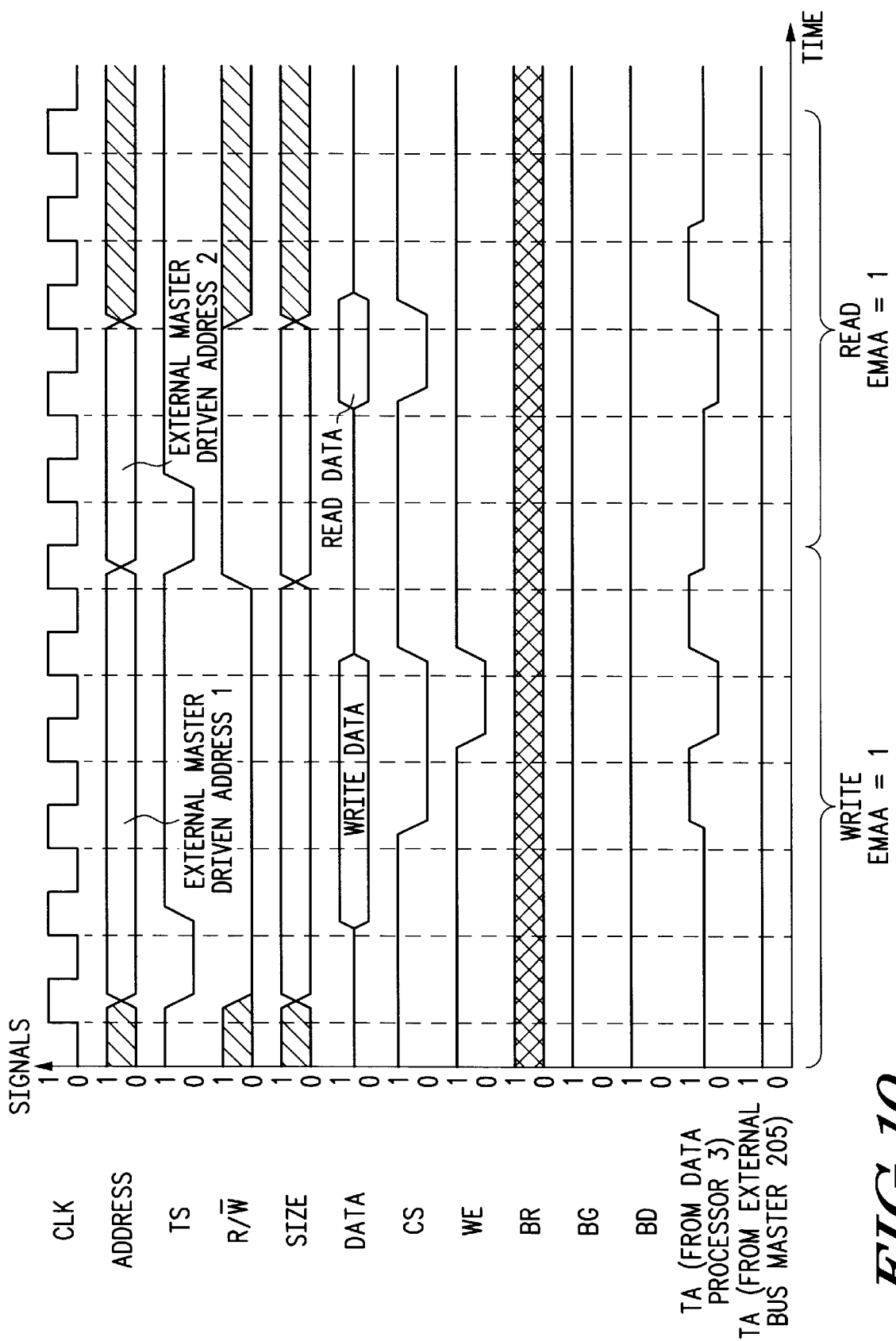
FIG. 10 illustrates in timing diagram form a first example of an external master initiated access of a chip-selectable circuit in accordance with the present invention.

FIG. 10 illustrates a first embodiment of the present invention in which memory 206 is first written and then read and the EMAA field in the CSCR of control registers 810 is asserted to indicate that memory controller 804 should provide the Transfer Acknowledge (TA) signal. In FIG. 10, the Clk (Clock) signal is provided. The generation, use, and routing of a clock signal in a data processing system are well known in the art and will not be discussed in further detail. As illustrated in FIG. 10, external bus master 205 provides an address value, a Transfer Start (TS) signal, a R/$\overline{\text{W}}$ signal, and a Size bus to data processor 3 during a first timing cycle. Note, that in the first portion of this timing example, the R/$\overline{\text{W}}$ signal is negated to indicate that external master 205 is writing a data value to memory 206. During a next timing cycle, the TS signal is negated and external bus master 205 begins driving data to be written to memory 206. During these timing cycles, the Transfer Acknowledge (TA) signal remains tri-stated.

One timing cycle after the TS signal is negated, memory controller 804 of the portion of system bus controller 8 asserts the Chip Select (CS) signal to indicate that memory 206, or any other selected device, has been accessed by external bus master 205. Additionally, memory controller 804 negates a Transfer Acknowledge (TA) signal during the same timing cycle.

During a next timing cycle, memory controller 804 asserts the Write Enable (WE) bus to enable an address location memory 206 transferred via the address bus to be written with the data provided by external bus master 205. Additionally, memory controller 804 asserts the Transfer Acknowledge (TA) signal during this next timing cycle.

In a subsequent timing cycle, the TA signal is again negated, while the CS signal and WE bus are negated and the data value tri-stated.

Subsequently, a memory read operation is executed and the timing thereof is illustrated in FIG. 10. As illustrated in FIG. 10, external bus master 205 provides another address value, a Transfer Start (TS) signal, a R/$\overline{W}$ signal, and a Size bus to data processor 3 during a first timing cycle. Note, that in the first portion of this timing example, the R/$\overline{W}$ signal is asserted to indicate that external bus master 205 is reading a data value from memory 206. During these timing cycles, the Transfer Acknowledge (TA) signal output by memory controller 804 remains tri-stated.

One timing cycle after the TS signal is negated, memory controller 804 of the portion of system bus controller 8 asserts the Chip Select (CS) signal to indicate that memory 206, or any other selected device, has been accessed by external bus master 205. Additionally, memory controller 804 asserts the Transfer Acknowledge (TA) signal during the same timing cycle. At that point in time, memory 206 provides a valid data value to external bus master 205.

During a next timing cycle, memory controller 804 negates the Transfer Acknowledge (TA) signal and the CS signal. During this next timing cycle, memory 206 tri-states the integrated circuit pins which were previously used to transfer the data value read therefrom by external bus master 205.

In a subsequent timing cycle, the TA signal output from memory controller 804 is again tri-stated.

Figure 15:
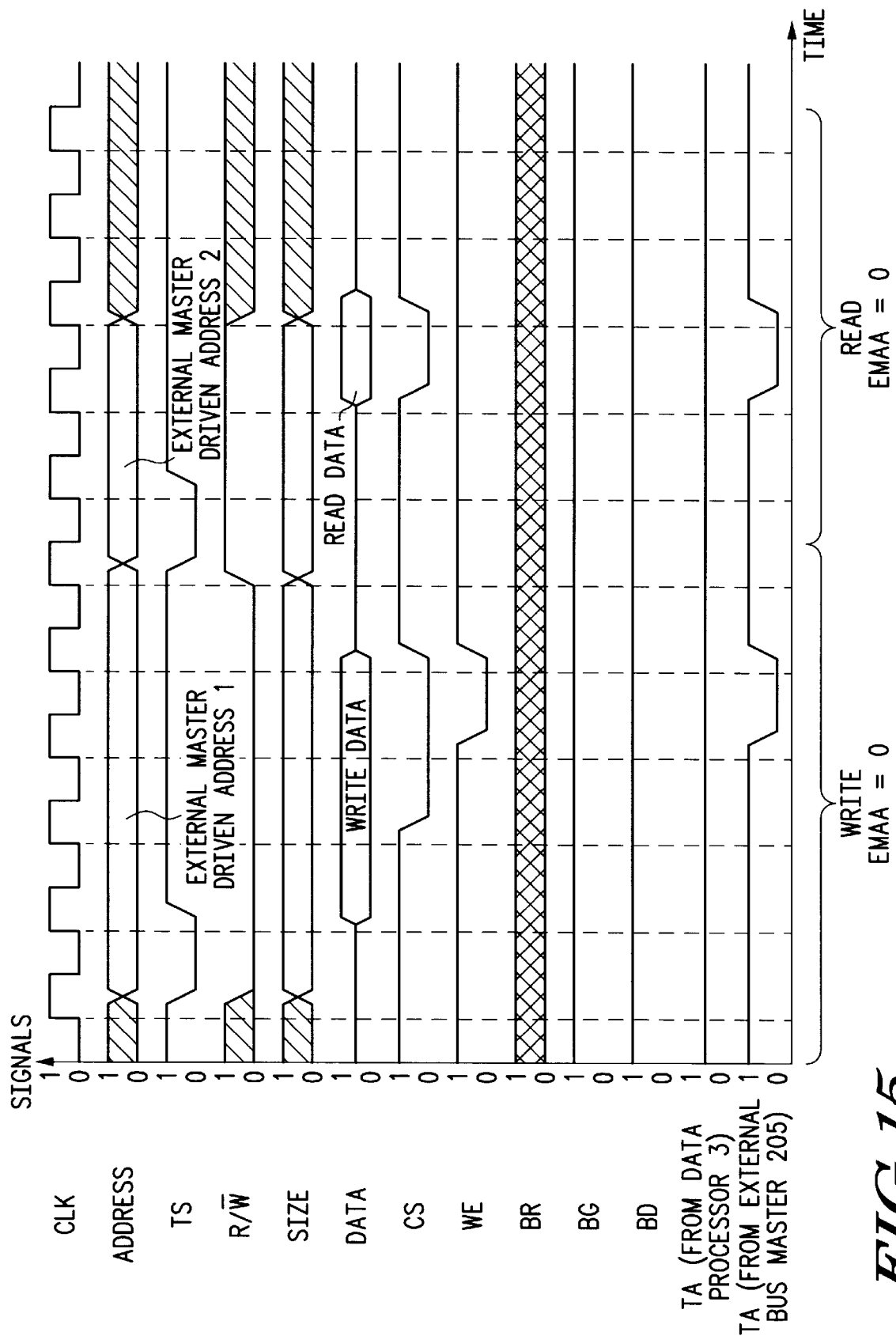
FIG. 15 illustrates in timing diagram form a second example of an external master initiated access of a chip-selectable circuit in accordance with the present invention.

FIG. 15 illustrates a second embodiment of the present invention in which memory 206 is first written and then read and the EMAA field in the CSCR of control registers 810 is negated to indicate that memory controller 804 should not provide the Transfer Acknowledge (TA) signal. In this case, the TA output from memory controller 804 will be tri-stated and the TA signal must be provided externally by external bus master 205 or another external circuit(not illustrated herein).

In FIG. 15, the Clk (Clock) signal is provided. The generation, use, and routing of a clock signal in a data processing system are well known in the art and will not be discussed in further detail. As illustrated in FIG. 15, external bus master 205 provides an address value, a Transfer Start (TS) signal, a R/$\overline{W}$ signal, and a Size bus to data processor 3 during a first timing cycle. Note, that in the first portion of this timing example, the R/$\overline{W}$ signal is negated to indicate that external master 205 is writing a data value to memory 206. During a next timing cycle, the TS signal is negated and external bus master 205 begins driving data to be written to memory 206. During this entire timing sequence, the Transfer Acknowledge (TA) signal output from memory controller 804 remains tri-stated.

One timing cycle after the TS signal is negated, memory controller 804 of the portion of system bus controller 8 asserts the Chip Select (CS) signal to indicate that memory 206, or any other selected device, has been accessed by external bus master 205. During these timing cycles, the TA signal output from external bus 205 or another external circuit (not illustrated herein) remains negated.

During a next timing cycle, memory controller 804 asserts the Write Enable (WE) bus to enable an address location memory 206 transferred via the address bus to be written with the data provided by external bus master 205. Additionally, external bus master 205 or another external circuit (not illustrated herein) asserts the Transfer Acknowledge (TA) signal during this next timing cycle.

In a subsequent timing cycle, the TA signal is again negated, while the CS signal and WE bus are negated and the data value tri-stated. The TA signal is asserted after a number of wait states required by external bus master 205 or another external circuit. Note, external bus master 205 or another external circuit that is asserting the TA signal may extend the assertion of the CS signal and WE bus to any number of cycles, without regard to the number of wait states indicated by the WS[3:0] bits of the CSCR of control registers 810.

Subsequently, a memory read operation is executed and the timing thereof is illustrated in FIG. 15. As illustrated in FIG. 15, external bus master 205 provides another address value, a Transfer Start (TS) signal, a R/$\overline{W}$ signal, and a Size bus to data processor 3 during a first timing cycle. Note, that in the first portion of this timing example, the R/$\overline{W}$ signal is asserted to indicate that external bus master 205 is reading a data value from memory 206. During these timing cycles, the Transfer Acknowledge (TA) signal output from memory controller 804 remains tri-stated.

One timing cycle after the TS signal is negated, memory controller 804 of the portion of system bus controller 8 asserts the Chip Select (CS) signal to indicate that memory 206, or any other selected device, has been accessed by external bus master 205. During these timing cycles, the TA signal output from external bus master 205 or another external circuit remains negated.

During a next timing cycle, memory 206 provides a valid data value to external bus master 205. External bus master 205 or another external circuit asserts the TA signal indicating the end of the bus cycle.

In a subsequent timing cycle, the TA signal is again negated, while the CS signal is negated and the data value is tri-stated. The TA signal is asserted after a number of wait states required by external bus master 205 and determined by external bus master 205 or another external circuit. Note, external bus master 205 or another external circuit that is asserting the TA signal may extend the assertion of the CS signal to any number of cycles, without regard to the number of wait states indicated by the WS[3:0] bits of the CSCR of control registers 810.

Figure 11:
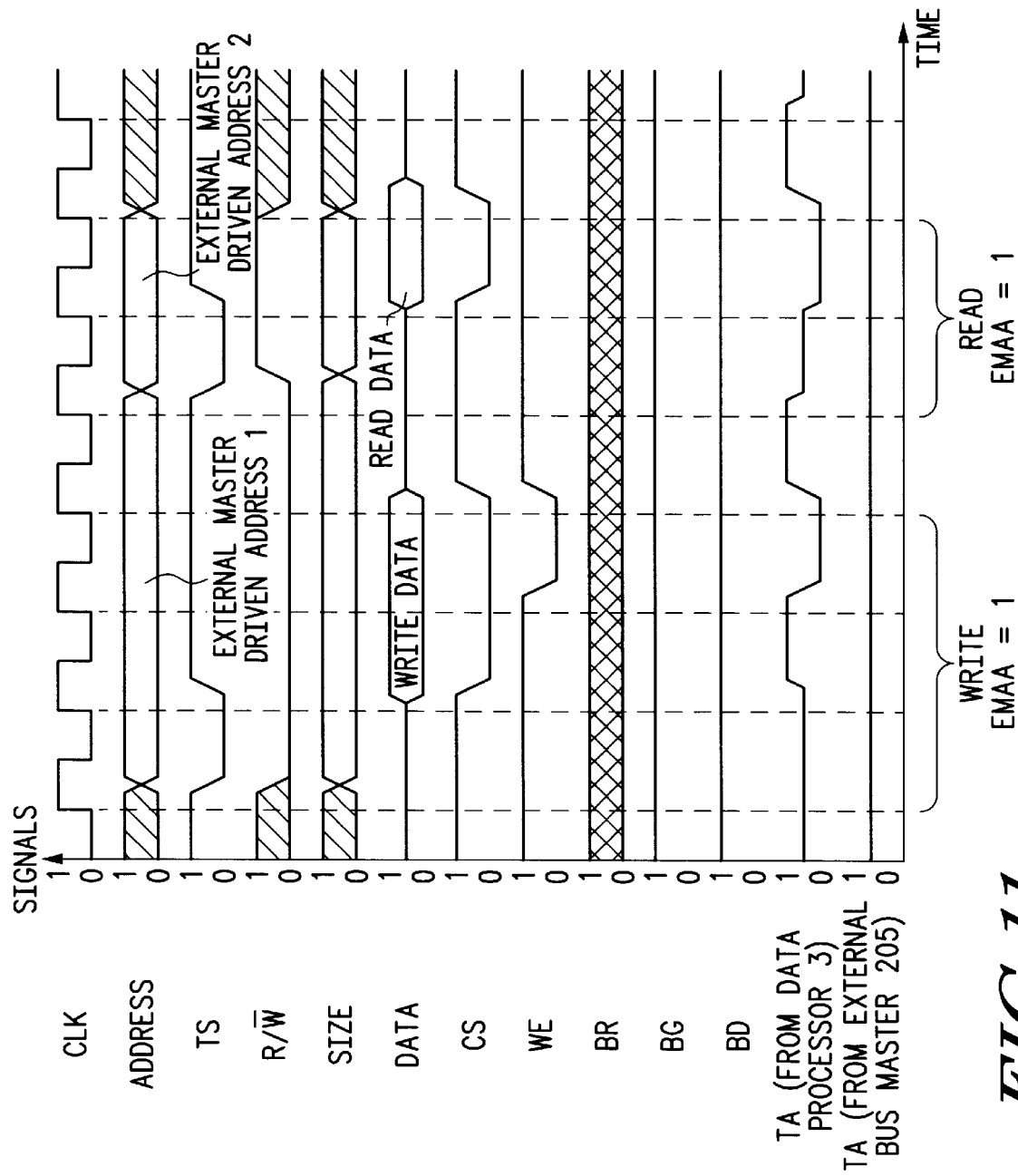
FIG. 11 illustrates in timing diagram form a third example of an external master initiated access of a chip-selectable circuit in accordance with the present invention.

FIG. 11 illustrates a third embodiment of the present invention in which memory 206 is first written and then read and the EMAA field in the CSCR of control registers 810 is asserted to indicate that memory controller 804 should provide the Transfer Acknowledge (TA) signal. In FIG. 11, the Clk (Clock) signal is provided. The generation, use, and routing of a clock signal in a data processing system are well known in the art and will not be discussed in further detail. As illustrated in FIG. 11, external bus master 205 provides an address value, a Transfer Start (TS) signal, a R/$\overline{W}$ signal, and a Size bus to data processor 3 during a first timing cycle. Note, that in the first portion of this timing example, the R/

23

$\overline{W}$ signal is negated to indicate that external bus master 205 is writing a data value to memory 206. During a next timing cycle, the TS signal is negated and external bus master 205 begins driving a valid size value of the data value to be written to memory 206. During these timing cycles, the Transfer Acknowledge (TA) signal remains tri-stated.

In a next timing cycle after the TS signal is negated, memory controller 804 of the portion of system bus controller 8 asserts the Chip Select (CS) signal to indicate that memory 206, or any other selected device, has been accessed by external bus master 205. Additionally, memory controller 804 negates a Transfer Acknowledge (TA) signal during the same timing cycle. Concurrently, external bus master 205 provides the data to be written to memory 206.

During a next timing cycle, memory controller 804 asserts the Write Enable (WE) bus to enable an address location memory 206 transferred via the address bus to be written with the data provided by external bus master 205. Additionally, memory controller 804 asserts the Transfer Acknowledge (TA) signal during this next timing cycle.

In a subsequent timing cycle, the TA signal is again negated, while the CS signal and WE bus are negated and the data value tri-stated.

Subsequently, a memory read operation is executed and the timing thereof is illustrated in FIG. 11. As illustrated in FIG. 11, external bus master 205 provides another address value, a Transfer Start (TS) signal, a R/$\overline{W}$ signal, and another Size bus to data processor 3 during a first timing cycle. Note, that in the first portion of this timing example, the R/$\overline{W}$ signal is asserted to indicate that data processor 3 is reading a data value from memory 206. During these timing cycles, the Transfer Acknowledge (TA) signal remains tri-stated.

In the same timing cycle the TS signal is negated, memory controller 804 of the portion of system bus controller 8 asserts the Chip Select (CS) signal to indicate that memory 206, or any other selected device, has been accessed by external bus master 205. Additionally, memory controller 804 asserts the Transfer Acknowledge (TA) signal during the same timing cycle. At that point in time, memory 206 provides a valid data value to data path 802 of the portion of system bus controller 8.

During a next timing cycle, memory controller 804 negates the Transfer Acknowledge (TA) signal and the CS signal. During this next timing cycle, memory 206 tri-states the integrated circuit pins which were previously used to transfer the data value read therefrom by external bus master 205.

In a subsequent timing cycle, the TA signal is again tri-stated.

Figure 16:
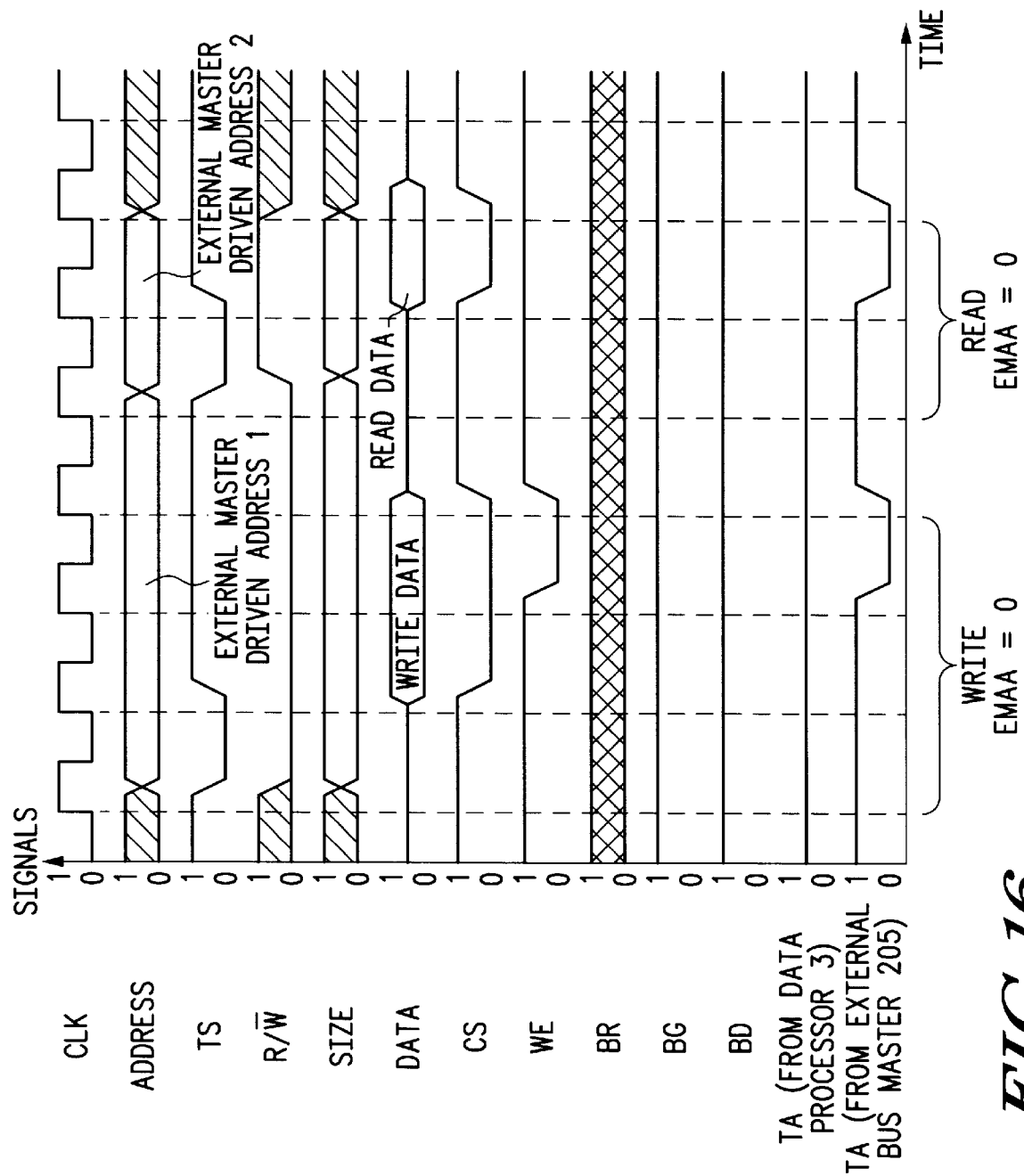
FIG. 16 illustrates in timing diagram form a fourth example of an external master initiated access of a chip-selectable circuit in accordance with the present invention.

FIG. 16 illustrates a fourth embodiment of the present invention in which memory 206 is first written and then read and the EMAA field in the CSCR of control registers 810 is negated to indicate that memory controller 804 should not provide the Transfer Acknowledge (TA) signal. In this case, the TA signal output form memory controller 804 will be tri-stated and the TA signal must be provided externally be external bus master 205 or another external circuit (not illustrated herein).

In FIG. 16, the Clk (Clock) signal is provided. The generation, use, and routing of a clock signal in a data processing system are well known in the art and will not be discussed in further detail. As illustrated in FIG. 16, external bus master 205 provides an address value, a Transfer Start (TS) signal, a R/$\overline{W}$ signal, and a Size bus to data processor 3 during a first timing cycle. Note, that in the first portion of this timing example, the R/$\overline{W}$ signal is negated to indicate

24 that external bus master 205 is writing a data value to memory 206. During a next timing cycle, the TS signal is negated and external bus master 205 begins driving the data to be written to memory 206. During this entire timing sequence, the Transfer Acknowledge (TA) signal output by memory controller 804 remains tri-stated.

In a next timing cycle after the TS signal is negated, memory controller 804 of the portion of system bus controller 8 asserts the Chip Select (CS) signal to indicate that memory 206, or any other selected device, has been accessed by external bus master 205. During these timing cycles, the TA signal output from external bus master 205 or another external circuit (not illustrated herein) remains negated.

During a next timing cycle, memory controller 804 asserts the Write Enable (WE) bus to enable an address location memory 206 transferred via the address bus to be written with the data provided by external bus master 205. Additionally, external bus master 205 or another external circuit (not illustrated herein) asserts the TA signal during this next timing cycle to indicate the end of the bus cycle.

In a subsequent timing cycle, the TA signal is again negated, while the CS signal and WE bus are negated and the data value tri-stated. The TA signal is asserted after a number of wait states required by external bus master 205 and determined by external bus master 205 or another external circuit. Note, external bus master 205 or another circuit that is asserting the TA signal may extend the assertion of the CS signal and WE bus to any number of timing cycles, without regard to the number of wait states indicated by the WS[3:0] bits of the CSCR of control registers 810.

Subsequently, a memory read operation is executed and the timing thereof is illustrated in FIG. 16. As illustrated in FIG. 16, external bus master 205 provides another address value, a Transfer Start (TS) signal, a R/$\overline{W}$ signal, and another Size bus to data processor 3 during a first timing cycle. Note, that in the first portion of this timing example, the R/$\overline{W}$ signal is asserted to indicate that data processor 3 is reading a data value from memory 206. During these timing cycles, the Transfer Acknowledge (TA) signal output by memory controller 804 remains tri-stated.

During a next timing cycle after the TS signal is negated, memory controller 804 of the portion of system bus controller 8 asserts the Chip Select (CS) signal to indicate that memory 206, or any other selected device, has been accessed by external bus master 205. During these timing cycles, the TA signal output from external bus master 205 or another external circuit remains negated.

During a next timing cycle, memory 206 provides a valid data value to external bus master 205. External bus master 205 or another external circuit asserts the TA signal indicating the end of the bus cycle.

In a subsequent timing cycle, the TA signal is again negated, while the CS signal is negated and the data value is tri-stated. The TA signal is asserted after a number of wait states required by external bus master 205 and determined by external bus master 205 or another external circuit. Note, external bus master 205 or another external circuit that is asserting the TA signal may extend the assertion of the CS signal to any number of cycles without regard to the number of wait states indicated by the WS[3:0] bits of the CSCR of control registers 810.

From the block diagrams, flow diagrams, and timing diagrams provided herein, it may be observed that the present invention removes the need for providing external generation of a transfer acknowledge signal when external bus master 205 uses the internal chip select generated by memory controller 804 of data processor 3. A user may program data processor 3 such that external master chip select accesses can be the same as the internal master accesses, after the address and attributes are stored. Additionally, the user can turn off the internal transfer acknowledge logic and add external transfer acknowledge logic while still using the internal chip select and write enable generation logic. This feature is user programmable on a chip select basis. The flexibility provided by this aspect of the present invention allows the user to compensate for the different timing of external master accesses without requiring external chip select and write enable generation logic. Therefore, overhead is conserved and efficiency is increased in this embodiment of the present invention.

As well, the circuit and method of the present invention allow external bus master 205 to access a chip-selectable memory using a different number of wait states than an internal master (data processor 3) without the addition of external memory control circuitry. To allow external bus master 205 to access memory 206 using chip select circuitry internal to data processor 3, the internal master, and using a different number of wait states than the internal master, the present invention allows a register bit to be programmed such that the internal chip select circuitry will not assert a transfer acknowledge signal on external accesses. Therefore, during external accesses, the chip select logic of data processor 3 will wait for an externally generated transfer acknowledge signal before negating the internally generated chip select signal and write enable bus. This aspect of the present invention reduces the amount of external logic required when the number of wait states is different between internal and external masters.

Internal Access of an External Memory

Referring again to FIG. 5, if the $\overline{\text{int\_ext\_master}}$ signal is negated, decode and address generation block 808 determines that an external master is not accessing an external memory and evaluates whether data processor 3 is attempting to access the external memory through the use of the MTS (Master Transfer Start) signal. If the MTS signal is asserted, data processor 3 is attempting an internal master access of the external memory.

If the MTS signal has been asserted, decode and address generation circuit 808 decodes the master address (MADDR) value, the MR/$\overline{\text{W}}$ signal, and the MSize bus to determine which device in data processing system 202 is being accessed. Decode and address generation circuit 808 then asserts the DRAM_hit signal to indicate that the address provided thereto accesses a memory location in DRAM 207. Similarly, decode and address generation circuit 808 asserts the CS_hit signal to indicate that the address provided thereto accesses another external device such as memory 206. It should be understood that while only memory 206 is illustrated in the present embodiment of the invention, other chip selectable devices may also be implemented instead or in addition to memory 206. Should other chip selectable devices be implemented, the CS_hit signal would indicate that the address provided to decode and address generation circuit 808 accesses one of those devices. Furthermore, it should be noted that memory 206 may be implemented as any type of external memory such as an SRAM, a ROM, a EEPROM, a Flash or a chip selectable peripheral device such as a serial interface or a timer.

If the DRAM_hit signal is asserted to indicate that a memory location in DRAM 207 has been accessed, memory controller 804 then enables decode and address generation circuit 808 to drive the TS, R/$\overline{\text{W}}$, Size, and Address values to the E-Bus. Memory controller 804 also enables bus arbitration circuit 806 to drive the Bus Request (BR) signal and the Bus Driven (BD) signal to the external memory via the E-bus. Furthermore, memory controller 804 provides the RAS, CAS, and DRAMW signals to the external memory via the E-bus. Data path 802 also drives data when the R/$\overline{\text{W}}$ signal is negated and samples data when the R/$\overline{\text{W}}$ is asserted during this mode of operation. Memory controller 804 subsequently drives the TA signal to indicate the end of the bus cycle.

If the DRAM_hit signal is negated to indicate that a memory location in DRAM 207 has been accessed, memory controller 804 then enables decode and address generation circuit 808 to drive the TS, R/$\overline{\text{W}}$, Size, and Address values to the external memory via the E-Bus. Furthermore, memory controller 804 provides the CS signal and WE bus to the external memory via the E-bus. Data path 802 also drives data when the R/$\overline{\text{W}}$ signal is negated and samples data when the R/$\overline{\text{W}}$ is asserted during this mode of operation. If AA is asserted, memory controller 804 asserts the TA signal after the number of wait states or if an external TA signal is asserted. When the TA signal is asserted by the external device to indicate an end of a bus cycle, memory controller 804 asserts the Master Transfer Acknowledge (MTA) signal. Data path 802 also drives data to other portions of data processor 3 via M-bus 23 when a read operation was executed.

Conclusion

The present invention provides a unique and useful apparatus and method for communicating information between a data processor, an external memory, and an external master. The apparatus and method of the present invention allows the data processor to properly control the external memory during an access by the external master such that less external interface circuitry is required and the overhead costs associated with the data processing system are reduced.

The implementation of the invention described herein is provided by way of example only. However, many other implementations may exist for executing the function described herein. For example, the present invention applies to the access of many types of external devices and is not limited to DRAM's. Additionally, it should be understood that control registers 810 illustrated in FIGS. 12-1 through 12-3 and 13-1 through 13-5 are may be augmented, decreased, and even deleted in some instances. As well, it should be understood that the DRAM controller may be implemented together or separately from the chip select functionality of the present invention. While the present invention has been illustrated and described with reference to specific embodiments, further modifications and improvements will occur to those skilled in the art. It is to be understood, therefore, that this invention is not limited to the particular forms illustrated and that the appended claims cover all modifications that do not depart from the scope of this invention.

We claim:

1. An apparatus for performing page mode accesses, comprising:

an internal bus for conducting address, control, and data signals;

a central processing unit coupled to said internal bus for executing instructions and accessing memory via said internal bus;

a programmable mode register coupled to said internal bus, having a first field which specifies a port size, and a second field which specifies a page size;

a memory controller having an input terminal coupled to said internal bus, a control input terminal coupled to the programmable mode register, and a control output terminal; and an address generation circuit having an input terminal coupled to said internal bus, a control input terminal coupled to the control output terminal of said memory controller, and an output terminal for providing a multiplexed external address to a plurality of integrated circuit pins, the multiplexed external address having a row portion which is valid on said plurality of integrated circuit pins during a first portion of a memory access, and a column portion which is valid on said plurality of integrated circuit pins during a second portion of the memory access, said address generation circuit altering the number and alignment of a plurality of address signals of said column portion on said plurality of integrated circuit pins in response to both said port size and said page size.

2. The apparatus of claim 1 wherein said memory controller further has first and second output terminals coupled to corresponding first and second integrated circuit pins for respectively providing a row address strobe signal and a column address strobe signal, said memory controller activating said row address strobe signal during said first portion of said memory access and said column address strobe signal during said second portion of said memory access.

3. The apparatus of claim 1 further comprising:

an external bus controller coupled to said internal bus and to an external bus, for conducting address, control, and data signals between said internal bus and said external bus, for providing a master signal in a first logic state to indicate that said central processing unit is master of said external bus, and for providing said master signal in a second logic state to indicate that an external bus master is master of said external bus; and said address generation circuit further having a control input terminal for receiving said master signal, wherein said address generation circuit further alters the number and alignment of said plurality of address signals of said column portion on said plurality of integrated circuit pins in response to both said port size and said page size when said master signal is in said second logic state.

4. The apparatus of claim 1 further comprising an address register for defining a predetermined region of memory, wherein said programmable mode register is further associated with said address register, and said address generation circuit further alters the number and alignment of said plurality of address signals of said column portion on said plurality of integrated circuit pins in response to both said port size and said page size only when said memory access is to said predetermined region of memory.

5. The apparatus of claim 4 further comprising:

a second address register for defining a second predetermined region of memory; and a second programmable mode register associated with said second address register and coupled to said internal bus, having a first field which specifies a second port size, and a second field which specifies a second page size, said address generation circuit further altering the number and alignment of said plurality of address signals of said column portion on said plurality of integrated circuit pins in response to both said second port size and said second page size in response to a memory access to said second predetermined region of memory.

6. A method for performing page mode accesses in a data processor including a central processing unit coupled to an internal bus, comprising the steps of:

storing a port size in a first field of a programmable control register coupled to the internal bus;

storing a page size in a second field of the programmable control register;

providing a row portion of a multiplexed external address to a plurality of integrated circuit pins during a first portion of a memory access to a predetermined region of memory; and providing a column portion of the multiplexed external address to the plurality of integrated circuit pins during a second portion of the memory access to the predetermined region of memory by altering the number and alignment of a plurality of address signals of said column portion on said plurality of integrated circuit pins in response to both said port size and said page size.

7. The method of claim 6 further comprising the steps of:

granting control of an external bus to an external bus master in response to a bus request signal;

receiving an external address generated by the external bus master and providing the external address to the internal bus;

determining that the external address conducted on the internal bus is to the predetermined region of memory; and performing the steps of providing the row portion, providing the column portion, and altering in response to the external address.

8. The method of claim 6 further comprising the steps of:

determining whether a memory access is to a predetermined region of memory associated with the programmable control register via the internal bus; and performing the steps of providing said row portion and providing said column portion by altering the number and alignment of said plurality of address signals in response to both said port size and said page size when said memory access is to said predetermined region of memory.

9. The method of claim 8 further comprising the steps of:

storing a second port size in a first field of a second programmable control register;

storing a second page size in a second field of the second programmable control register; and determining whether a memory access is to a second predetermined region of memory associated with the second programmable control register via the internal bus and if the memory access is to said second predetermined region of memory then performing the steps of:

providing the row portion of the multiplexed external address to the plurality of integrated circuit pins during the first portion of the memory access to the second predetermined region of memory; and providing the column portion of the multiplexed external address to the plurality of integrated circuit pins during the second portion of the memory access to the second predetermined region of memory by altering the number and alignment of said plurality of address signals of said column portion in response to both said second port size and said second page size.

* * * * *